(12) United States Patent
Taylor et al.

(10) Patent No.: US 6,518,974 B2
(45) Date of Patent: Feb. 11, 2003

(54) PIXEL ENGINE

(75) Inventors: Ralph Clayton Taylor, Deland, FL (US); Michael Mantor, Orlando, FL (US); Vineet Goel, Winter Park, FL (US); Val Gene Cook, Shingle Springs, CA (US); Stuart Krupnik, Spring Valley, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/978,973

(22) Filed: Oct. 16, 2001

(65) Prior Publication Data

US 2002/0167523 A1 Nov. 14, 2002

Related U.S. Application Data

(63) Continuation of application No. 09/799,943, filed on Mar. 5, 2001, which is a continuation of application No. 09/618,082, filed on Jul. 17, 2000.

(60) Provisional application No. 60/144,288, filed on Jul. 16, 1999.

(51) Int. Cl.$^7$ ................................................. G09G 5/02
(52) U.S. Cl. ...................... 345/582; 345/606; 345/614; 345/657; 345/610; 345/589
(58) Field of Search ................................. 345/606, 614, 345/657, 582, 610, 589

(56) References Cited

U.S. PATENT DOCUMENTS

| | | | |
|---|---|---|---|
| 4,656,467 A | * | 4/1987 | Strolle ......................... 342/185 |
| 4,727,365 A | | 2/1988 | Bunker et al. |
| 4,905,164 A | | 2/1990 | Chandler et al. |
| 4,965,745 A | | 10/1990 | Economy et al. |
| 5,949,428 A | * | 9/1999 | Toelle et al. ................. 345/589 |
| 5,977,984 A | * | 11/1999 | Omori ......................... 345/589 |
| 6,067,090 A | * | 5/2000 | Sreenivas et al. ............ 345/589 |
| 6,188,409 B1 | * | 2/2001 | Pajarre et al. ............... 345/582 |
| 6,204,857 B1 | * | 3/2001 | Piazza et al. ................ 345/582 |

* cited by examiner

Primary Examiner—Matthew Luu
Assistant Examiner—Mike Rahmjoo
(74) Attorney, Agent, or Firm—Scully, Scott, Murphy & Presser

(57) ABSTRACT

In accordance with the present invention, the rate of change of texture addresses when mapped to individual pixels of a polygon is used to obtain the correct level of detail (LOD) map from a set of prefiltered maps. The method comprises a first determination of perspectively correct texture address values found at four corners of a predefined span or grid of pixels. Then, a linear interpolation technique is implemented to calculate a rate of change of texture addresses for pixels between the perspectively bound span corners. This linear interpolation technique is performed in both screen directions to thereby create a level of detail value for each pixel. The YUV formats described above have Y components for every pixel sample, and UN (they are also named Cr and Cb) components for every fourth sample. Every UN sample coincides with four (2×2) Y samples. This is identical to the organization of texels in U.S. Pat. No. 4,965,745 "YIQ-Based Color Cell Texturing", incorporated herein by reference. The improvement of this algorithm is that a single 32-bit word contains four packed Y values, one value each for U and V, and optionally four one-bit Alpha components:

YUV_0566: 5-bits each of four Y values, 6-bits each for U and V

YUV_1544: 5-bits each of four Y values, 4-bits each for U and V, four 1-bit Alphas These components are converted from 4-, 5-, or 6-bit values to 8-bit values by the concept of color promotion. The reconstructed texels consist of Y components for every texel, and UN components repeated for every block of 2×2 texels. The combination of the YIQ-Based Color Cell Texturing concept, the packing of components into convenient 32-bit words, and color promoting the components to 8-bit values yields a compression from 96 bits down to 32 bits, or 3:1. There is a similarity between the trilinear filtering equation (performing bilinear filtering of four samples at each of two LODs, then linearly filtering those two results) and the motion compensation filtering equation (performing bilinear filtering of four samples from each of a "previous picture" and a "future picture", then averaging those two results). Thus some of the texture filtering hardware can do double duty and perform the motion compensation filtering when those primitives are sent through the pipeline. The palette RAM area is conveniently used to store correction data (used to "correct" the predicted images that fall between the "I" images in an MPEG data stream) since, during motion compensation the texture palette memory would otherwise be unused.

3 Claims, 7 Drawing Sheets

PIXEL ENGINE

CROSS REFERENCE TO RELATED APPLICATIONS

The present application is a continuation application of Ser. No. 09/799,943 filed on Mar. 5, 2001, which is a continuation application of Ser. No. 09/618,082 dated Jul. 17, 2000 which is a conversion of provisional application Ser. No. 60/144,288 filed Jul. 16, 1999.

This application is related to U.S. patent application Ser. No. 09/617,416 filed on Jul. 17, 2000 and titled VIDEO PROCESSING ENGINE OVERLAY FILTER SCALER.

FIELD OF THE INVENTION

This invention relates to real-time computer image generation systems and, more particularly, to Aa system for texture mapping, including selecting an appropriate level of detail (LOD) of stored information for representing an object to be displayed, texture compression and motion compensation.

BACKGROUND OF THE INVENTION

In certain real-time computer image generation systems, objects to be displayed are represented by convex polygons which may include texture information for rendering a more realistic image. The texture information is typically stored in a plurality of two-dimensional texture maps, with each texture map containing texture information at a predetermined level of detail ("LOD") with each coarser LOD derived from a finer one by filtering as is known in the art. Further details regarding computer image generation and texturing, can be found in U.S. Pat. No. 4,727,365 which is incorporated herein by reference thereto.

Color definition is defined by a luminance or brightness (Y) component, an in-phase component (I) and a quadrature component (Q) and which are appropriately processed before being converted to more traditional red, green and blue (RGB) components for color display control. Scaling and redesigning YIQ data, also known as YUV, permits representation by fewer bits than a RGB scheme during processing. Also, Y values may be processed at one level of detail while the corresponding I and Q data values may be processed at a lesser level of detail. Further details can be found in U.S. Pat. No. 4,965,745, incorporated herein by reference.

U.S. Pat. No. 4,985,164, incorporated herein by reference, discloses a full color real-time cell texture generator uses a tapered quantization scheme for establishing a small set of colors representative of all colors of a source image. A source image to be displayed is quantitized by selecting the color of the small set nearest the color of the source image for each cell of the source image. Nearness is measured as Euclidian distance in a three-space coordinate system of the primary colors: red, green and blue. In a specific embodiment, an 8-bit modulation code is used to control each of the red, green, blue and translucency content of each display pixel, thereby permitting independent modulation for each of the colors forming the display image.

In addition, numerous 3D computer graphic systems provide motion compensation for DVD playback.

SUMMARY OF THE INVENTION

In accordance with the present invention, the rate of change of texture addresses when mapped to individual pixels of a polygon is used to obtain the correct level of detail (LOD) map from a set of prefiltered maps. The method comprises a first determination of perspectively correct texture address values found at four corners of a predefined span or grid of pixels. Then, a linear interpolation technique is implemented to calculate a rate of change of texture addresses for pixels between the perspectively bound span corners. This linear interpolation technique is performed in both screen directions to thereby create a level of detail value for each pixel.

The YUV formats described above have Y components for every pixel sample, and UN (they are also named Cr and Cb) components for every fourth sample. Every UN sample coincides with four (2×2) Y samples. This is identical to the organization of texels in U.S. Pat. No. 4,965,745 "YIQ-Based Color Cell Texturing", incorporated herein by reference. The improvement of this algorithm is that a single 32-bit word contains four packed Y values, one value each for U and V, and optionally four one-bit Alpha components:

YUV_0566: 5-bits each of four Y values, 6-bits each for U and V

YUV_1544: 5-bits each of four Y values, 4-bits each for U and V, four 1-bit Alphas These components are converted from 4-, 5-, or 6-bit values to 8-bit values by the concept of color promotion.

The reconstructed texels consist of Y components for every texel, and UN components repeated for every block of 2×2 texels.

The combination of the YIQ-Based Color Cell Texturing concept, the packing of components into convenient 32-bit words, and color promoting the components to 8-bit values yields a compression from 96 bits down to 32 bits, or 3:1.

There is a similarity between the trilinear filtering equation (performing bilinear filtering of four samples at each of two LODs, then linearly filtering those two results) and the motion compensation filtering equation (performing bilinear filtering of four samples from each of a "previous picture" and a "future picture", then averaging those two results). Thus some of the texture filtering hardware can do double duty and perform the motion compensation filtering when those primitives are sent through the pipeline. The palette RAM area is conveniently used to store correction data (used to "correct" the predicted images that fall between the "I" images in an MPEG data stream) since, during motion compensation the texture palette memory would otherwise be unused.

DETAILED DESCRIPTION OF THE INVENTION

In a computer graphics system, the entire 3D pipeline, with the various streamers in the memory interface, can be thought of as a generalized "Pixel Engine". This engine has five input streams and two output streams. The first four streams are addressed using Cartesian coordinates which define either a triangle or an axis aligned rectangle. There are three sets of coordinates defined. The (X,Y) coordinate set describes a region of two destination surfaces. The $(U_0,V_0)$ set identifies a region of source surface 0 and $(U_1,V_1)$ specifies a region for source surface 1. A region is identified by three vertices. If the region is a rectangle the upper left, upper right and lower left vertices are specified. The regions in the source surfaces can be of arbitrary shape and a mapping between the vertices is performed by various address generators which interpolate the values at the vertices to produce the intermediate addresses. The data associated with each pixel is then requested. The pixels in the source surfaces can be filtered and blended with the pixels in the destination surfaces.

Many other arithmetic operations can be performed on the data presented to the engine. The fifth input stream consists of scalar values that are embedded in a command packet and aligned with the pixel data in a serial manner. The processed pixels are written back to the destination surfaces as addressed by the (X,Y) coordinates.

The 3D pipeline should be thought of as a black box that performs specific functions that can be used in creative ways to produce a desired effect. For example, it is possible to perform an arithmetic stretch blit with two source images that are composited together and then alpha blended with a destination image over time, to provide a gradual fade from one image to a second composite image.

Figure 1:
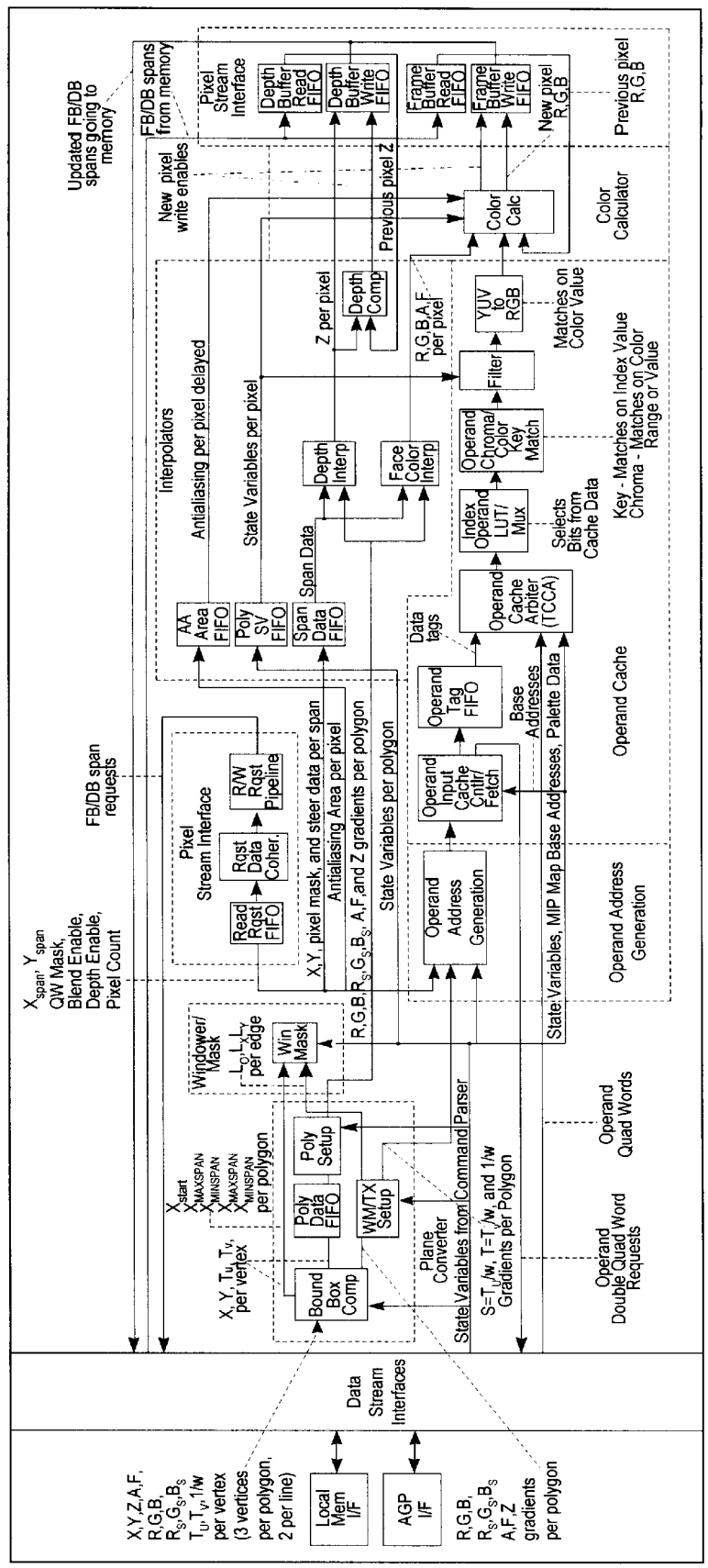
FIG. 1 is a block diagram identifying major functional blocks of the pixel engine.

FIG. 1 is a block diagram which identifies major functional blocks of the pixel engine. Each of these blocks are described in the following sections.

Command Stream Controller

The Command Stream Interface provides the Mapping Engine with palette data and primitive state data. The physical interface consists of a wide parallel state data bus that transfers state data on the rising edge of a transfer signal created in the Plane Converter that represents the start of a new primitive, a single write port bus interface to the mip base address, and a single write port to the texture palette for palette and motion compensation correction data.

Plane Converter

The Plane Converter unit receives triangle and line primitives and state variables The state variables can define changes that occur immediately, or alternately only after a pipeline flush has occurred. Pipeline flushes will be required while updating the palette memories, as these are too large to allow pipelining of their data. In either case, all primitives rendered after a change in state variables will reflect the new state.

The Plane Converter receives triangle/line data from the Command Stream Interface (CSI). It can only work on one triangle primitive at a time, and CSI must wait until the setup computation be done before it can accept another triangle or new state variables. Thus it generates a "Busy" signal to the CSI while it is working on a polygon. It responds to three different "Busy" signals from downstream by not sending new polygon data to the three other units (i.e. Windower/Mask, Pixel Interpolator, Texture Pipeline). But once it receives an indication of "not busy" from a unit, that unit will receive all data for the next polygon in a continuous burst (although with possible empty clocks). The Plane Converter cannot be interrupted by a unit downstream once it has started this transmission.

The Plane Converter also provides the Mapping Engine with planar coefficients that are used to interpolate perspective correct S, T, 1/W across a primitive relative to screen coordinates. Start point values that are removed from U and V in the Plane Converter\Bounding Box are sent to be added in after the perspective divide in order to maximize the precision of the C0 terms. This prevents a large number of map wraps in the U or V directions from saturating a small change in S or T from the start span reference point.

The Plane Converter is capable of sending one or two sets of planar coefficients for two source surfaces to be used by the compositing hardware. The Mapping Engine provides a flow control signal to the Plane Converter to indicate when it is ready to accept data for a polygon. The physical interface consist of a 32 bit data bus to serially send the data.

Bounding Box Calculation

Figure 2:
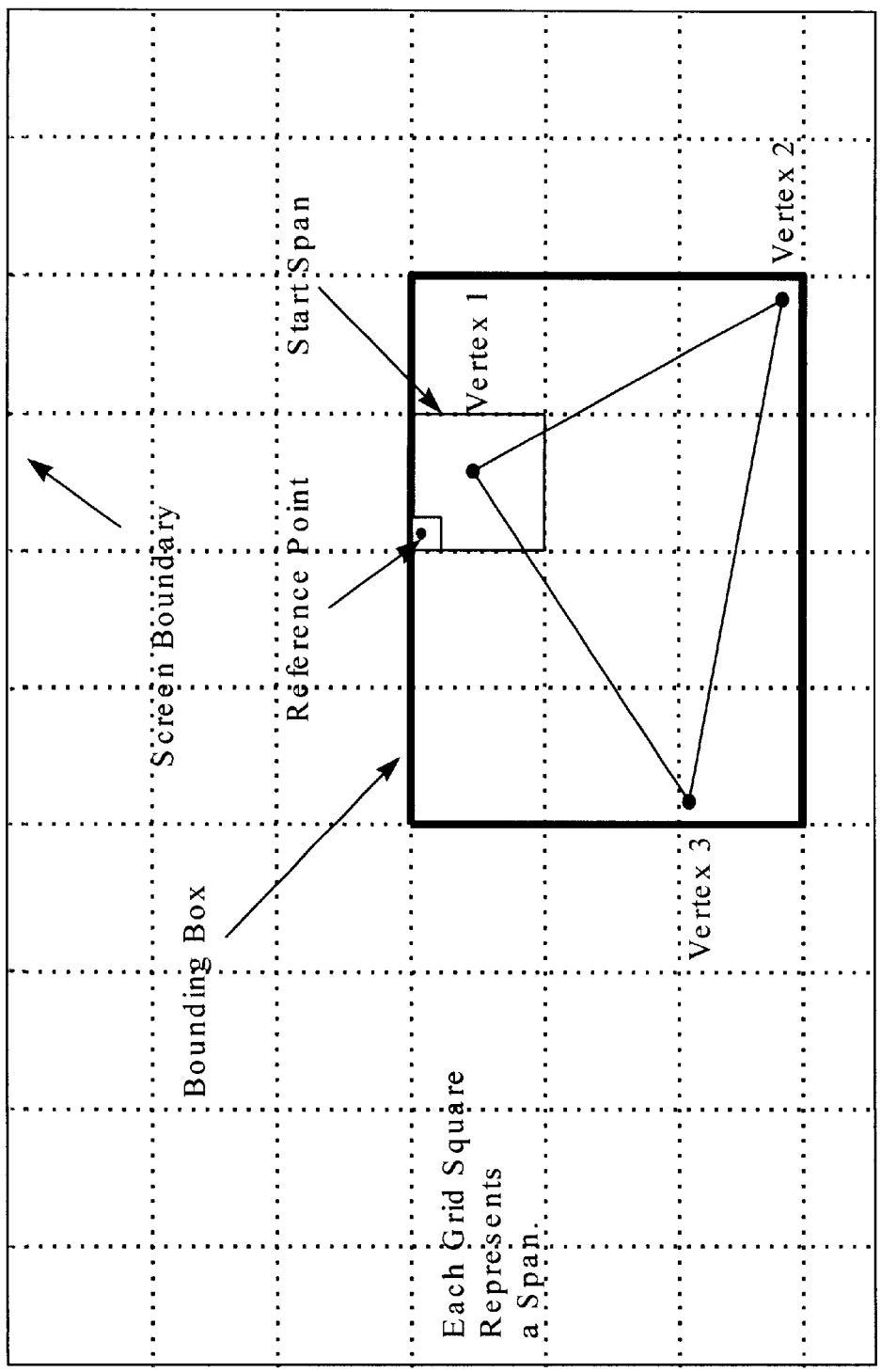
FIG. 2 illustrates the bounding box calculation.

This function computes the bounding box of the polygon. As shown in FIG. 2, the screen area to be displayed is composed of an array of spans (each span is 4×4 pixels). The bounding box is defined as the minimum rectangle of spans that fully contains the polygon. Spans outside of the bounding box will be ignored while processing this polygon.

The bounding box unit also recalculates the polygon vertex locations so that they are relative to the upper left corner (actually the center of the upper left corner pixel) of the span containing the top-most vertex. The span coordinates of this starting span are also output.

The bounding box also normalizes the texture U and V values. It does this by determining the lowest U and V that occurs among the three vertices, and subtracts the largest even (divisible by two) number that is smaller (lower in magnitude) than this. Negative numbers must remain negative, and even numbers must remain even for mirror and clamping modes to work.

Plane Conversion

This function computes the plane equation coefficients (Co, Cx, Cy) for each of the polygon's input values (Red, Green, Blue, Reds, Greens, Blues, Alpha, Fog, Depth, and Texture Addresses U, V, and 1/W).

The function also performs a culling test as dictated by the state variables. Culling may be disabled, performed counter-clockwise or performed clockwise. A polygon that is culled will be disabled from further processing, based on the direction (implied by the order) of the vertices. Culling is performed by calculating the cross product of any pair of edges, and the sign will indicate clockwise or counter-clockwise ordering.

Texture perspective correction multiplies U and V by 1/W to create S and T:

This function first computes the plane converter matrix and then generates the following data for each edge:

| | |
|---|---|
| Co, Cx, Cy | (1/W) perspective divide plane coefficients |
| Co, Cx, Cy | (S, T) - texture plane coefficients with perspective divide |
| Co, Cx, Cy | (red, green, blue, alpha) - color/alpha plane coefficients |
| Co, Cx, Cy | (red, green, blue specular) - specular color coefficients |
| Ca, Cx, Cy | (fog) - fog plane coefficients |
| Co, Cx, Cy | (depth) - depth plane coefficients (normalized 0 to 65535/65536) |
| Lo, Lx, Ly | edge distance coefficients |

All Co terms are relative to the value at the center of the upper left corner pixel of the span containing the top-most vertex. Cx and Cy define the change in the x and y directions, respectively. The coefficients are used to generate an equation of a plane, $R(x,y)=Co+Cx*\Delta x+Cy*\Delta y$, that is defined by the three corner values and gives the result at any x and y. Equations of this type will be used in the Texture and Face Span Calculation functions to calculate values at span corners.

The Cx and Cy coefficients are determined by the application of Cramer's rule. If we define $\Delta x_1$, $\Delta X_2$, $\Delta x_3$ as the horizontal distances from the three vertices to the "reference point" (center of pixel in upper left corner of the span containing the top-most vertex), and $\Delta y_1$, $\Delta y_2$, and $\Delta y_3$ as the vertical distances, we have three equations with three unknowns. The example below shows the red color components (represented as $red_1$, $red_2$, and $red_3$, at the three vertices):

$$Co_{red}+Cx_{red}*\Delta x_1+Cy_{red}*\Delta y_1=red_1$$

$$Co_{red}+Cx_{red}*\Delta x_2+Cy_{red}*\Delta y_2=red_2$$

$$Co_{red}+Cx_{red}*\Delta x_1+Cy_{red}*\Delta y_1=red_1$$

The Lo value of each edge is based on the Manhattan distance from the upper left corner of the starting span to the edge. Lx and Ly describe the change in distance with respect to x and y directions. Lo, Lx, and Ly are sent from the Plane Converter to the Windower function. The formula for Lx and Ly are as follows:

$$Lx = \frac{-\Delta y}{|\Delta x| + |\Delta y|} \qquad Ly = \frac{\Delta x}{|\Delta x| + |\Delta y|}$$

Where $\Delta x$ and $\Delta y$ are calculated per edge by subtracting the values at the vertices. The Lo of the upper left corner pixel is calculated by applying $$Lo=Lx*(x_{ref}-x_{vert})+Ly*(Y_{ref}-Y_{vert})$$

where $x_{vert}$, $y_{vert}$ represent the vertex values and $x_{ref}$, $y_{ref}$ represent the reference point.

Red, Green, Blue, Alpha, Fog, and Depth are converted to fixed point on the way out of the plane converter. The only float values out of the plane converter are S, T, and 1/W. Perspective correction is only performed on the texture coefficients.

Windower/Mask

The Windower/Mask unit performs the scan conversion process, where the vertex and edge information is used to identify all pixels that are affected by features being rendered. It works on a per-polygon basis, and one polygon may be entering the pipeline while calculations finish on a second. It lowers its "Busy" signal after it has unloaded its input registers, and raises "Busy" after the next polygon has been loaded in. Twelve to eighteen cycles of "warm-up" occur at the beginning of new polygon processing where no valid data is output. It can be stopped by "Busy" signals that are sent to it from downstream at any time.

The input data of this function provides the start value (Lo, Lx, Ly) for each edge at the center of upper left corner pixel of the start span per polygon. This function walks through the spans that are either covered by the polygon (fully or partially) or have edges intersecting the span boundaries. The output consists of search direction controls.

This function computes the pixel mask for each span indicated during the scan conversion process. The pixel mask is a 16-bit field where each bit represents a pixel in the span. A bit is set in the mask if the corresponding pixel is covered by the polygon. This is determined by solving all three line equations (Lo+Lx*x+Ly*y) at the pixel centers. A positive answer for all three indicates a pixel is inside the polygon; a negative answer from any of the three indicates the pixel is outside the polygon.

If none of the pixels in the span are covered this function will output a null (all zeroes) pixel mask. No further pixel computations will be performed in the 3D pipeline for spans with null pixel masks, but span-based interpolators must process those spans.

The windowing algorithm controls span calculators (texture, color, fog, alpha, Z, etc.) by generating steering outputs and pixel masks. This allows only movement by one span in right, left, and down directions. In no case will the windower scan outside of the bounding box for any feature.

The windower will control a three-register stack. One register saves the current span during left and right movements. The second register stores the best place from which to proceed to the left. The third register stores the best place from which to proceed downward. Pushing the current location onto one of these stack registers will occur during the scan conversion process. Popping the stack allows the scan conversion to change directions and return to a place it has already visited without retracing its steps.

The Lo at the upper left corner (actually center of upper left corner pixel) shall be offset by 1.5*Lx+1.5*Ly to create the value at the center of the span for all three edges of each polygon. The worst case of the three edge values shall be determined (signed compare, looking for smallest, i.e. most negative, value). If this worst case value is smaller (more negative) than −2.0, the polygon has no included area within this span. The value of −2.0 was chosen to encompass the entire span, based on the Manhattan distance.

The windower will start with the start span identified by the Bounding Box function (the span containing the topmost vertex) and start scanning to the right until a span where all three edges fail the compare Lo>−2.0 (or the bounding box limit) is encountered. The windower shall then "pop" back to the "best place from which to go left" and start scanning to the left until an invalid span (or bounding box limit) is encountered. The windower shall then "pop" back to the "best place from which to go down" and go down one span row (unless it now has crossed the bounding box bottom value). It will then automatically start scanning to the right, and the cycle continues. The windowing ends when the bounding box bottom value stops the windower from going downward.

The starting span, and the starting span in each span row (the span entered from the previous row by moving down), are identified as the best place from which to continue left and to continue downward. A (potentially) better place to continue downward shall be determined by testing the Lo at the bottom center of each span scanned (see diagram above). The worst case Lo of the three edge set shall be determined at each span. Within a span row, the highest of these values (or best of the worst) shall be maintained and compared against for each new span. The span that retains the "best of the worst" value for Lo is determined to be the best place from which to continue downward, as it is logically the most near the center of the polygon.

The pixel mask is calculated from the Lo upper left corner value by adding Ly to move vertically, and adding Lx to move horizontally. All sixteen pixels will be checked in parallel, for speed. The sign bit (inverted, so '1' means valid) shall be used to signify a pixel is "hit" by the polygon.

By definition, all polygons have three edges. The pixel mask for all three edges is formed by logical 'AND' ing of the three individual masks, pixel by pixel. Thus a '0' in any pixel mask for an edge can nullify the mask from the other two edges for that pixel.

The Windower/Mask controls the Pixel Stream Interface by fetching (requesting) spans. Within the span request is a pixel row mask indicating which of the four pixel rows (QW) within the span to fetch. It will only fetch valid spans, meaning that if all pixel rows are invalid, a fetch will not occur. It determines this based on the pixel mask, which is the same one sent to the rest of the renderer.

Antialiasing of polygons is performed in the Windower/Mask by responding to flags describing whether a particular edge will be antialiased. If an edge is so flagged, a state variable will be applied which defines a region from 0.5 pixels to 4.0 pixels wide over which the antialiasing area will vary from 0.0 and 1.0 (scaled with four fractional bits, between 0.0000 and 0.1111) as a function of the distance from the pixel center to the edge. See FIG. 3.

This provides a simulation of area coverage based on the Manhattan distance between the pixel center and the polygon edge. The pixel mask will be extended to allow the polygon to occupy more pixels. The combined area coverage value of one to three edges will be calculated based on the product of the three areas. Edges not flagged as being antialiased will not be included in the product (which implies their area coverage was 1.0 for all valid pixels in the mask).

A state variable controls how much a polygon's edge may be offset. This moves the edge further away from the center of the polygon (for positive values) by adding to the calculated La. This value varies from −4.0 to +3.5 in increments of 0.5 pixels. With this control, polygons may be artificially enlarged or shrunk for various purposes.

The new area coverage values are output per pixel row, four at a time, in raster order to the Color Calculator unit.

Stipple Pattern

A stipple pattern pokes holes into a triangle or line based on the x and y window location of the triangle or line. The user specifies and loads a 32 word by 32 bit stipple pattern that correlates to a 32 by 32 pixel portion of the window. The 32 by 32 stipple window wraps and repeats across and down the window to completely cover the window.

The stipple pattern is loaded as 32 words of 32 bits. When the stipple pattern is accessed for use by the windower mask, the 16 bits per span are accessed as a tile for that span. The read address most significant bits are the three least significant bits of the y span identification, while the read address least significant bits are the x span identification least significant bits.

Subpixel Rasterization Rules

Using the above quantized vertex locations for a triangle or line, the subpixel rasterization rules use the calculation of Lo, Lx, and Ly to determine whether a pixel is filled by the triangle or line. The Lo term represents the Manhattan distance from a pixel to the edge. If Lo positive, the pixel is on the clockwise side of the edge. The Lx and Ly terms represent the change in the Manhattan distance with respect to a pixel step in x or y respectively. The formula for Lx and Ly re as follows:

$$Lx = \frac{-\Delta y}{|\Delta x| + |\Delta y|} \qquad Ly = \frac{\Delta x}{|\Delta x| + |\Delta y|}$$

Where $\Delta x$ and $\Delta y$ are calculated per edge by subtracting the values at the vertices. The Lo of the upper left corner pixel of the start span is calculated by applying $$Lo = Lx*(x_{ref} - x_{vert}) + Ly*(y_{ref} - y_{vert})$$

where $x_{vert}$, $y_{vert}$ represent the vertex values and $x_{ref}$, $y_{ref}$ represent the reference point or start span location. The Lx and Ly terms are calculated by the plane converter to fourteen fractional bits. Since x and y have four fractional bits, the resulting Lo is calculated to eighteen fractional bits. In order to be consistent among complementary edges, the Lo edge coefficient is calculated with top most vertex of the edge.

The windower performs the scan conversion process by walking through the spans of the triangle or line. As the windower moves right, the Lo accumulator is incremented by Lx per pixel. As the windower moves left, the Lo accumulator is decremented by Lx per pixel. In a similar manner, Lo is incremented by Ly as it moves down.

For a given pixel, if all three or four Lo accumulations are positive, the pixel is filled by the triangle or line. If any is negative, the pixel is not filled by the primitive.

The inclusive/exclusive rules for Lo are dependent upon the sign of Lx and Ly. If Ly is non-zero, the sign of Ly is used. If Ly is zero, the sign of Lx is used. If the sign of the designated term is positive, the Lo zero case is not filled. If the sign of the designated term is negative, the Lo zero case is filled by the triangle or line.

The inclusive/exclusive rules get translated into the following general rules. For clockwise polygons, a pixel is included in a primitive if the edge which intersects the pixel center points from right to left. If the edge which intersects the pixel center is exactly vertical, the pixel is included in the primitive if the intersecting edge goes from top to bottom. For counter-clockwise polygons, a pixel is included in a primitive if the edge which intersects the pixel center points from left to right. If the edge which intersects the pixel center is exactly vertical, the pixel is included in the primitive if the intersecting edge goes from bottom to top.

Lines

A line is defined by two vertices which follow the above vertex quantization rules. Since the windower requires a closed polygon to fill pixels, the single edge defined by the two vertices is expanded to a four edge rectangle with the two vertices defining the edge length and the line width state variable defining the width.

The plane converter calculates the Lo, Lx, and Ly edge coefficients for the single edge defined by the two input vertices and the two cap edges of the line segment.

As before, the formula for Lx and Ly of the center of the line are as follows:

$$Ly0 = \frac{\Delta x}{|\Delta x| + |\Delta y|}$$

Where $\Delta x$ and $\Delta y$ are calculated per edge by subtracting the values at the vertices. Since the cap edges are perpendicular to the line edge, the Lx and the Ly terms are swapped and one is negated for each edge cap. For edge cap zero, the Lx and Ly terms are calculated from the above terms with the following equations:

$$Lx1=-Ly0Ly1=Lx0$$

For edge cap one, the Lx and Ly terms are derived from the edge Lx and Ly terms with the following equations:

$$Lx2=Ly0Ly2=-Lx0$$

Using the above Lx and Ly terms, the Lo term is derived from Lx and Ly with the equation $$Lo=Lx*(x_{ref}-x_{vert})+Ly*(y_{ref}-y_{vert})$$

where $X_{vert}$, $y_{vert}$ represent the vertex values and $x_{ref}$, $y_{ref}$ represent the reference point or start span location. The top most vertex is used for the line edge, while vertex zero is always used for edge cap zero, and vertex one is always used for edge cap one.

The windower receives the line segment edge coefficients and the two edge cap edge coefficients. In order to create the four sided polygon which defines the line, the windower adds half a state variable to the edge segment Lo for Lo0 and then subtracts the result from the line width for Lo3 The line width specifies the total width of the line from 0.0 to 3.5 pixels.

The width is specified over which to blend for antialiasing of lines and wireframe representations of polygons. The line antialiasing region can be specified as 0.5, 1.0, 2.0, or 4.0 pixels with that representing a region of 0.25, 0.5, 1.0, or 2.0 pixels on each side of the line. The antialiasing regions extend inward on the line length and outward on the line endpoint edges. Since the two endpoint edges extend outward for antialiasing, one half of the antialiasing region is added to those respective Lo values before the fill is determined. The alpha value for antialiasing is simply the Lo value divided by one half of the line antialiasing region. The alpha is clamped between zero and one.

The windower mask performs the following computations:

Lo0'=Lo0+(line_width/2)
Lo3=−Lo0'+line_width

If antialiasing is enabled,

Lo1'=Lo1+(line_aa_region/2)
Lo2'=Lo2+(line_aa_region/2)

The mask is determined to be where Lo'>0.0
The alpha value is Lo'/(line$_{13}$ aa_region /2) clamped between 0 and 1.0

For triangle attributes, the plane converter derives a two by three matrix to rotate the attributes at the three vertices to create the Cx and Cy terms for that attribute. The C0 term is calculated from the Cx and Cy term using the start span vertex. For lines, the two by three matrix for Cx and Cy is reduced to a two by two matrix since lines have only two input vertices. The plane converter calculates matrix terms for a line by deriving the gradient change along the line in the x and y direction. The total rate of change of the attribute along the line is defined by the equation:

$$Red\_Gradient = \frac{\Delta Red}{\sqrt{(\Delta x)^2 + (\Delta y)^2}}$$

The gradient is projected along the x dimension with the equation:

$$CX_{RED} = \frac{\Delta x * Red\_Gradient}{\sqrt{(\Delta x)^2 + (\Delta y)^2}}$$

which is simplified to the equation:

$$CX_{RED} = \frac{\Delta x * \Delta Red}{(\Delta x)^2 + (\Delta y)^2}$$

Pulling out the terms corresponding to Red0 and Red1 yields the matrix terms m10 and m11 with the following equations:

$$M10 = \frac{-\Delta x}{(\Delta x)^2 + (\Delta y)^2}$$

$$M11 = \frac{\Delta x}{(\Delta x)^2 + (\Delta y)^2}$$

In a similar fashion, the matrix terms m20 and m21 are derived to be the equations:

$$M20 = \frac{-\Delta y}{(\Delta x)^2 + (\Delta y)^2}$$

For each enabled Gouraud shaded attribute, the attribute per vertex is rotated through the two by two matrix to generate the Cx and Cy plane equation coefficients for that attribute.

Points are internally converted to a line which covers the center of a pixel. The point shape is selectable as a square or a diamond shape. Attributes of the point vertex are copied to the two vertices of the line.

Windower Fetch Requests for 8-Bit Pixels

Motion Compensation with YUV4:2:0 Planar surfaces require a destination buffer with 8 bit elements. This will require a change in the windower to minimally instruct the Texture Pipeline of what 8 bit pixel to start and stop on. One example method to accomplish this would be to have the Windower realize that it is in the Motion Compensation mode and generate two new bits per span along with the 16 bit pixel mask. The first bits set would indicate that the 8 bit pixel before the first lit column is lit and the second bit set would indicate that the 8 bit pixel after the last valid pixel column is lit if the last valid column was not the last column. This method would also require that the texture pipe repack the two 8 bit texels into a 16 bit packed pixel and passed through the color calculator unchanged and written to memory as a 16 bit value. Also byte enables would have to be sent if the packed pixel only contains one 8 bit pixel to prevent the memory interface from writing 8 bit pixels that it are not supposed to be written over.

Pixel Interpolator

The Pixel Interpolator unit works on polygons received from the Windower/Mask. A sixteen-polygon delay FIFO equalizes the latency of this path with that of the Texture Pipeline and Texture Cache.

The Pixel Interpolator Unit can generate a "Busy" signal if its delay FIFOs become full, and hold up further transmissions from the Windower/Mask. The empty status of these FIFOs will also be managed so that the pipeline doesn't attempt to read from them while they are empty. The Pixel Interpolator Unit can be stopped by "Busy" signals that are sent to it from the Color Calculator at any time.

The Pixel Interpolator also provides a delay for the Antialiasing Area values sent from the Windwer/Mask, and the State Variable signals

Face Color Interpolator

This function computes the red, green, blue, specular red, green, blue, alpha, and fog components for a polygon at the center of the upper left corner pixel of each span. It is provided steering direction by the Windower and face color gradients from the Plane Converter. Based on these steering commands, it will move right by adding 4*Cx, move left by subtracting 4*Cx, or move down by adding 4*Cy. It also maintains a two-register stack for left and down directions. It will push values onto this stack, and pop values from this stack under control of the Windower/Mask unit.

This function then computes the red, green, blue, specular red, green, blue, alpha, and fog components for a pixel using the values computed at the upper left span corner and the Cx and Cy gradients. It will use the upper left corner values for all components as a starting point, and be able to add +1Cx, +2Cx, +1Cy, or +2Cy on a per-clock basis. A state machine will examine the pixel mask, and use this information to skip over missing pixel rows and columns as efficiently as possible. A full span would be output in sixteen consecutive clocks. Less than full spans would be output in fewer clocks, but some amount of dead time will be present (notably, when three rows or columns must be skipped, this can only be done in two clocks, not one).

If this Function Unit Block (FUB) receives a null pixel mask, it will not output any valid pixels, and will merely increment to the next upper left corner point.

Depth Interpolator

This function first computes the upper left span corner depth component based on the previous (or start) span values and uses steering direction from the Windower and depth gradients from the Plane Converter. This function then computes the depth component for a pixel using the values computed at the upper left span corner and the Cx and Cy gradients. Like the Face Color Interpolator, it will use the Cx and Cy values and be able to skip over missing pixels efficiently. It will also not output valid pixels when it receives a null pixel mask.

Color Calculator

The Color Calculator may receive inputs as often as two pixels per clock, at the 100 MHz rate. Texture RGBA data will be received from the Texture Cache. The Pixel Interpolator Unit will send R, G, B, A, $R_s$, $G_s$, $B_s$, F, Z data. The Local Cache Interface will send Destination R, G, B, and Z data. When it is enabled, the Pixel Interpolator Unit will send antialiasing area coverage data per pixel.

This unit monitors and regulates the outputs of the units mentioned above. When valid data is available from all, it will unload its input registers and deassert "Busy" to all units (if it was set). If all units have valid data, it will continue to unload its input registers and work at its maximum throughput. If any one of the units does not have valid data, the Color Calculator will send "Busy" to the other units, causing their pipelines to freeze until the busy unit responds.

The Color Calculator will receive the two LSBs of pixel address X and Y, as well as an "Last_Pixel_of_row" signal that is coincident with the last pixel of a span row. These will come from the Pixel Interpolator Unit.

The Color Calculator receives state variable information from the CSI unit.

The Color Calculator is a pipeline, and the pipeline may contain multiple polygons at any one time. Per-polygon state variables will travel down the pipeline, coincident with the pixels of that polygon.

Color Calculation

This function computes the resulting color of a pixel. The red, green, blue, and alpha components which result from the Pixel Interpolator are combined with the corresponding components resulting from the Texture Cache Unit. These textured pixels are then modified by the fog parameters to create fogged, textured pixels which are color blended with the existing values in the Frame Buffer. In parallel, alpha, depth, stencil, and window_id buffer tests are conducted which will determine whether the Frame and Depth Buffers will be updated with the new pixel values.

This FUB must receive one or more quadwords, comprising a row of four pixels from the Local Cache Interface, as indicated by pixel mask decoding logic which checks to see what part of the span has relevant data. For each span row up to two sets of two pixels are received from the Pixel Interpolator. The pixel Interpolator also sends flags indicating which of the pixels are valid, and if the pixel pair is the last to be transmitted for the row. On the write back side, it must re-pack a quadword block, and provide a write mask to indicate which pixels have actually been overwritten.

Color Blending

The Mapping Engine is capable of providing to the Color Calculator up to two resultant filtered texels at a time when in the texture compositing mode and one filtered texel at a time in all other modes. The Texture Pipeline will provide flow control by indicating when one pixel worth of valid data is available at its output and will freeze the output when its valid and the Color Calculator is applying a hold. The interface to the color calculator will need to include two byte enables for the 8 bit modes When multiple maps per pixel is enabled, the plane converter will send two sets of planar coefficients per primitive. The DirectX 6.0 API defines multiple textures that are applied to a polygon in a specific order. Each texture is combined with the results of all previous textures or diffuse color\alpha for the current pixel of a polygon and then with the previous frame buffer value using standard alpha-blend modes . Each texture map specifies how it blends with the previous accumulation with a separate combine operator for the color and alpha channels.

For the Texture Unit to process multiple maps per pixel at rate, all the state information of each map, and addresses from both maps would need to be known at each pixel clock time. This mode shall run the texture pipe at half rate. The state data will be serially written into the existing state variable fifo's with a change in the existing fifo's to output the current or next set of state data depending on the currents pixels map id.

Combining Intrinsic and Specular Color Components

If specular color is inactive, only intrinsic colors are used. If this state variable is active, values for R, G, B are added to values for Rs, Gs, Bs component by component. All results are clamped so that a carry out of the MSB will force the answer to be all ones (maximum value).

Linear VertexFogging

Fog is specified at each vertex and interpolated to each pixel center. If fog is disabled, the incoming color intensities are passed unchanged. Fog is interpolative, with the pixel color determined by the following equation:

Interpolative:

$$C = f*C_P + (1-f)*C_F$$

Where f is the fog coefficient per pixel, $C_P$ is the polygon color, and $C_F$ is the fog color.

Exponential FragmentFogging

Fog factors are calculated at each fragment by means of a table lookup which may be addressed by either w or z. The table may be loaded to support exponential or exponetial2 type fog. If fog is disabled, the incoming color intensities are passed unchanged. Given the result of the table lookup for tog factor is f the pixel color after fogging is determined by the following equation:

Interpolative:

$$C = f*C_P + (1-f)*C_F$$

Where f is the fog coefficient per pixel, $C_P$ is the polygon color, and $C_F$ is the fog color.

Alpha Testing

Based on a state variable, this function will perform an alpha test between the pixel alpha (previous to any dithering) and a reference alpha value.

The, alpha testing is comparing the alpha output from the texture blending stage with the alpha reference value in SV.

Pixels that pass the Alpha Test proceed for further processing. Those that fail are disabled from being written into the Frame and Depth Buffer.

Source and Destination Blending

If Alpha Blending is enabled, the current pixel being calculated (known as the source) defined by its RGBA components is combined with the stored pixel at the same x, y address (known as the destination) defined by its RGBA components. Four blending factors for the source ($S_R$, $S_G$, $S_B$, $S_A$) and destination ($D_R$, $D_G$, $D_B$, $D_A$) pixels are created. They are multiplied by the source ($R_S$, $G_S$, $B_S$, $A_S$) and destination ($R_D$, $G_D$, $B_D$, $A_D$) components in the following manner:

$$(R', G', B', A') = (R_S S_R + R_D D_R, G_S S_G + G_D D_G, B_S S_B + B_D D_B, A_S S_A + A_D D_A)$$

All components are then clamped to the region greater than or equal to 0 and less than 1.0.

Depth Compare

Based on the state, this function will perform a depth compare between the pixel Z (as calculated by the Depth Interpolator) (known as source Z or $Z_S$) and the Z value read from the Depth Buffer at the current pixel address (known as destination Z or $Z_D$). If the test is not enabled, it is assumed the Z test always passes. If it is enabled, the test performed is based on the value of, as shown in the "State" column of Table 1 below.

TABLE 1

| State | Function | Equation |
|-------|----------|----------|
| 1 | Less | $Z_s < Z_D$ |
| 2 | Equal | $Z_s = Z_D$ |
| 3 | Lequal | $Z_s \leq Z_D$ |
| 4 | Greater | $Z_s > Z_D$ |
| 5 | Notequal | $Z_s \neq Z_D$ |
| 6 | Gequal | $Z_s \geq Z_D$ |
| 7 | Always | — |

Mapping Engine (Texture Pipeline)

This section focuses primarily on the functionality provided by the Mapping Engine (Texture Pipeline). Several, seeming unrelated, features are supported through this pipeline. This is accomplished by providing a generalized interface to the basic functionality needed by such features as 3D rendering and motion compensation. There are several formats which are supported for the input and output streams. These formats are described in a later section.

Figure 4:
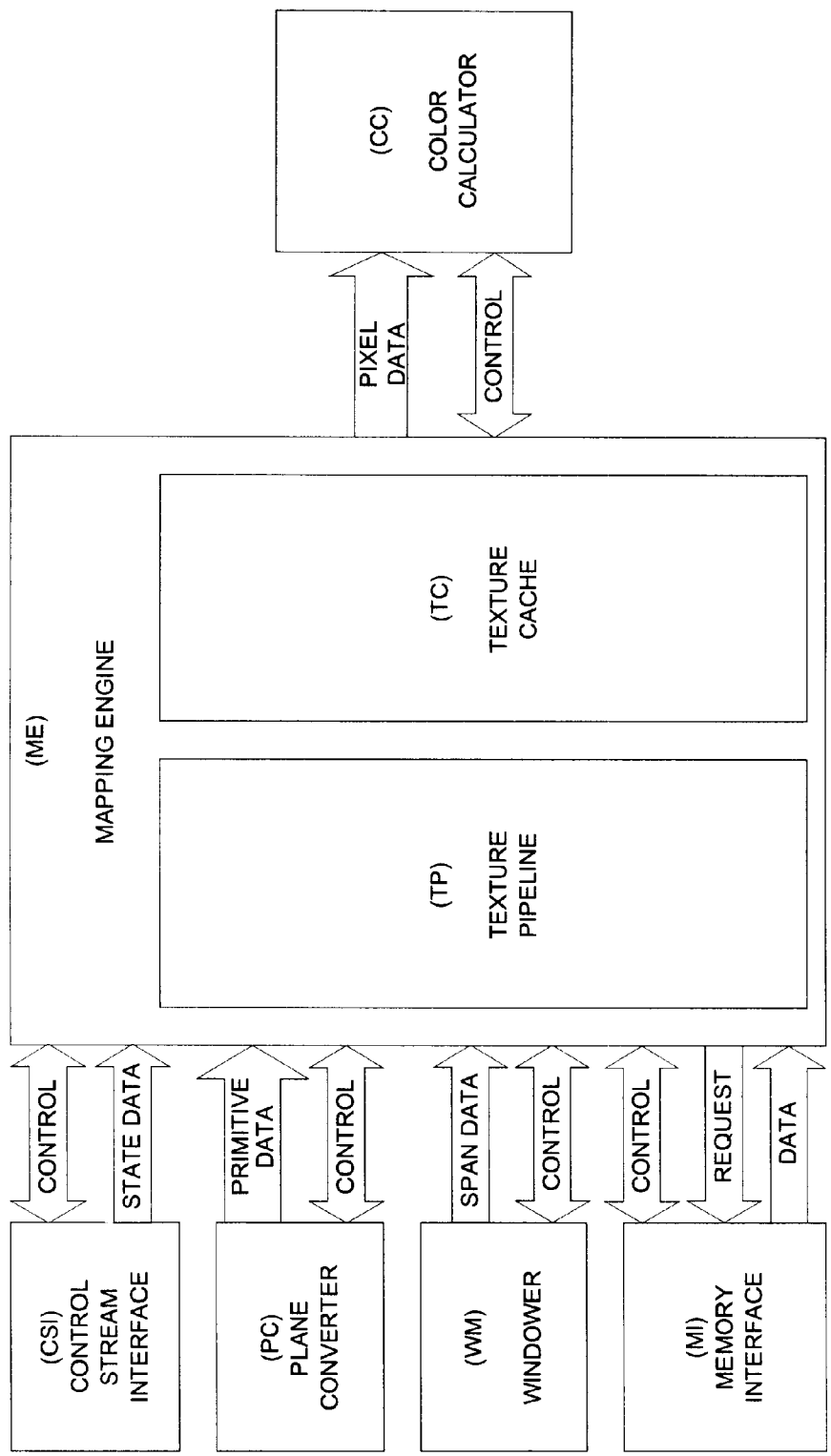
FIG. 4 is a high level block diagram of the pixel engine.

FIG. 4 shows how the Mapping Engine unit connects to other units of the pixel engine.

Figure 5:
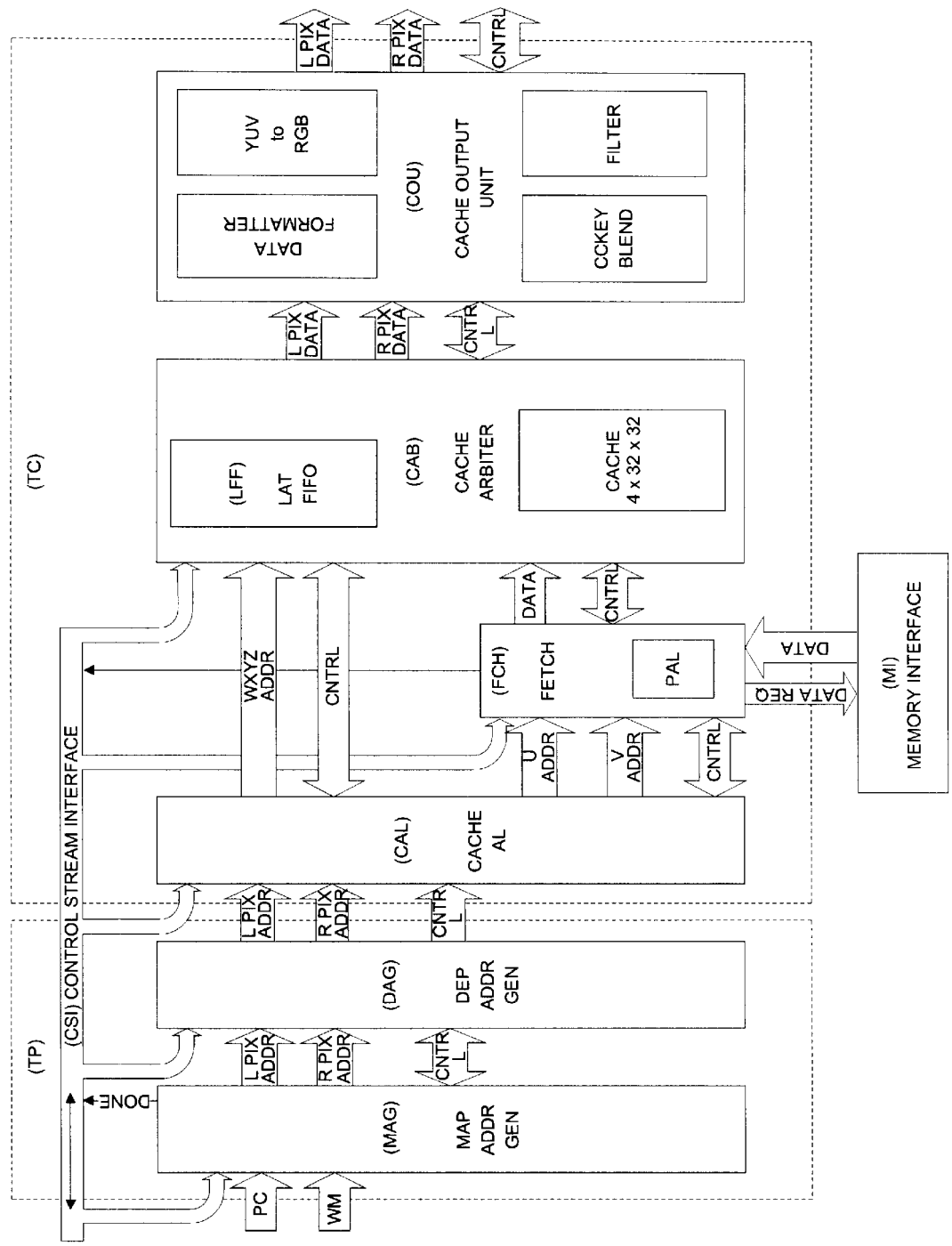
FIG. 5 is a block diagram of the mapping engine.

The Mapping Engine receives pixel mask and steering data per span from the Windower/Mask, gradient information for S, T, and 1/W from the Plane Converter, and state variable controls from the Command Stream Interface. It works on a per-span basis, and holds state on a per-polygon basis. One polygon may be entering the pipeline while calculations finish on a second. It lowers its "Busy" signal after it has unloaded its input registers, and raises "Busy" after the next polygon has been loaded in. It can be stopped by "Busy" signals that are sent to it from downstream at any time. FIG. 5 is a block diagram identifying the major blocks of the Mapping Engine.

Map Address Generator (MAG)

The Map Address Generator produces perspective correct addresses and the level-of-detail for every pixel of the primitive. The CSI and the Plane Converter deliver state variables and plane equation coefficients to the Map Address Generator. The Windower provides span steering commands and the pixel mask. The derivation described below is provided. A definition of terms aids in understanding the following equations:

U or u: The u texture coordinate at the vertices.

V or v: The v texture coordinate at the vertices.

W or w: The homogenous w value at the vertices (typically the depth value).

The inverse of this value will be referred to as inv_W or inv_w.

| | |
|---|---|
| COn | The value of attribute n at some reference point. (X' = 0, Y' = 0) |
| CXn | The change of attribute n for one pixel in the raster X direction. |
| CYn | The change of attribute n for one pixel in the raster Y direction. |

Perspective Correct Addresses per Pixel Determination

This is accomplished by performing a perspective divide of S and T by 1/W per pixel, as shown in the following equations.

$$S = \frac{U}{W} \quad T = \frac{V}{W}$$

The S and T terms can be linearly interpolated in screen space. The values of S, T, and Inv_W are interpolated using the following terms which are computed by the plane converter.

COs, CXs, Cys: The start value and rate of change in raster x,y for the S term.

C0t, CXt, Cyt: The start value and rate of change in the raster x,y for the T term.

C0inv_w, CXinv_w, CYinv_w: The start value and rate of change in the raster x,y for the 1/W term.

$$U = \frac{C0s + CXs*X + CYs*Y}{C0inv\_w + CXinv\_w*X + CYinv\_w*Y}$$

$$V = \frac{C0t + CXt*X + CYt*Y}{C0inv\_w + CXinv\_w*X + CYinv\_w*Y}$$

These U and V values are the perspective correct interpolated map coordinates. After the U and V perspective correct values are found then the start point offset is added back in and the coordinates are multiplied by the map size to obtain map relative addresses. This scaling only occurs when state variable is enabled.

Level-Of-Detail per Pixel Determination

The level-of-detail provides the necessary information for mip-map selection and the weighting factor for trilinear blending.

The pure definition of the texture LOD is the Log2 (rate of change of the texture address in the base texture map at a given point). The texture LOD value is used to determine which mip level of a texture map should be used in order to provide a 1:1 texel to pixel correlation. When the formula for determining the texture address was written and the partial derivatives with respect to raster x and y were taken, the following equations results and shows a very simple derivation with a simple final result which defines each partial derivative.

The following derivation will be described for one of the four interesting partial derivatives (du/dx, du/dy, dv/dx, dv/dy). The derivative rule to apply is $$\frac{d}{dx}\left[\frac{num}{den}\right] = \frac{den*\frac{dnum}{dx} - num*\frac{dden}{dx}}{den^2}.$$

Applying this rule to the previous U equation yields $$\frac{du}{dx} = \frac{den*CXs - num*CXinv\_w}{den^2}$$

If we note that the denominator (den) is equal to 1/W at the pixel (x,y) and the numerator is equal to S at the pixel (x,y), we have:

$$\frac{du}{dx} = \frac{Inv\_W*CXs - S*CXinv\_w}{Inv\_W^2}$$

Finally, we can note that S at the pixel (x,y) is equal to U/W or U*Inv_W at the pixel (x,y) such that $$\frac{du}{dx} = \frac{Inv\_W*CXs - U*Inv\_W*CXinv\_w}{Inv\_W^2}$$

Canceling out the common Inv_W terms and reverting back to W (instead of Inv_W), we conclude that $$\frac{du}{dx} = W*[CXs - U*CXinv\_w]$$

The CXs and CXinv_w terms are computed by the plane converter and are readily available and that the W and U terms are already computed per pixel. Equation 6 has been tested and provides the indisputable correct determination of the instantaneous rate of change of the texture address as a function of raster x.

Applying the same derivation to the other three partial derivatives yields:

$$\frac{du}{dy} = W*[CYs - U*CYinv\_w]$$

$$\frac{dv}{dx} = W*[CXt - V*CXinv\_w]$$

$$\frac{dv}{dy} = W*[CYt - V*CYinv\_w]$$

There is still some uncertainty in the area of the correct method for combining these tour terms to determine the texture level-of-detail. Paul Heckbert and the OpenGL Spec suggest $$LOD = Log2\left[MAX\left[\sqrt{\left(\frac{du}{dx}\right)^2 + \left(\frac{dv}{dx}\right)^2}, \sqrt{\left(\frac{du}{dy}\right)^2 + \left(\frac{dv}{dy}\right)^2}\right]\right]$$

Regardless of the "best" combination method, the W value can be extracted from the individual derivative terms and combined to the final result, as in $$LOD = Log2\left[W*MAX\left[\begin{array}{c}\sqrt{(CXs - U*CXinv\_w)^2 + (CXt - V*CXinv\_w)^2}, \\ \sqrt{(CYs - U*CYinv\_w)^2 + (CYt - V*CYinv\_w)^2}\end{array}\right]\right]$$

If the Log2 function is relatively inexpensive (some may approximate it by simply treating the floating-point exponent as the integer part of the log2 and the mantissa as the fractional part of the log2), it may be better to use $$LOD = Log2(W) +$$
$$Log2\left[MAX\left[\begin{array}{c}\sqrt{(CXs - U*CXinv\_w)^2 + (CXt - V*CXinv\_w)^2}, \\ \sqrt{(CYs - U*CYinv\_w)^2 + (CYt - V*CYinv\_w)^2}\end{array}\right]\right]$$

which would only require a fixed point add instead of a floating point multiply.

A bias is added to the calculated LOD allowing a (potentially) per-polygon adjustment to the sharpness of the texture pattern.

The following is the C++ source code for texture LOD calculation algorithm described above:

```
ulong MeMag::FindLod(FLT24 Wval, FLT24 U_LessOffset, FLT24 V_LessOffset,
    MeMagPolyData*PolyData, long Mapid)
{
    long dudx_exp, dudy_exp, dvdx_exp, dvdy_exp,
w_exp, x_exp, y_exp, result_exp;
    long dudx_mant, dudy_mant, dvdx_mant, dvdy_mant,
w_mant;
    long x_mant, y_mant, result_mant;
    ulong result;
    ulong myovfl;
    FLT24 dudx, dudy, dvdx, dvdy;
    /* find u*Cxw and negate u*Cw term and then add to Cxs value */
    dudx=MeMag::FpMult(U_LessOffset, PolyData->W.Cx, &myovfl);
    dudx.Sign=(dudx.Sign) ? 0:1;
    dudx=MeMag::FpAdd(PolyData->S.Cx, dudx, &myovfl,
_MagSv->log2_pitch[Mapid]);
    /* find v*Cxw and negate v*Cw term and then add to Cxt value */
    dvdx=MeMag::FpMult(V_LessOffset, PolyData->W.Cx, &myovfl);
    dvdx.Sign=(dvdx.Sign) ? 0:1;
    dvdx=MeMag::FpAdd(PolyData->T.Cx, dvdx,
&myovfl,_MagSv->log2_height[Mapld]);
    /* find u*Cyw and negate u*Cw term and then add to Cxs value */
    dudy=MeMag::FpMuft(U_LessOffset, PolyData->W.Cy, &myovfl);
    dudy.Sign=(dudy.Sign) ? 0:1;
    dudy=MeMag::FpAdd(PolyData->S.Cy, dudy, &myovfl,
_MagSv->log2_pitch[Mapld]);
    /* find v*Cyw and negate v*Cw term and then add to Cyt value */
    dvdy=MeMag::FpMult(V_LessOffset, PolyData->W.Cy, &myovfl);
    dvdy.Sign=(dvdy.Sign) ? 0:1;
    dvdy=MeMag::FpAdd(PolyData->T.Cy, dvdy,
&myovfl,_MagSv->log2_height[Mapid]);
    /* Seperate exponents */
    w_exp=Wval.Exp;
    dudx_exp=dudx.Exp;
    dudy_exp=dudy.Exp;
    dvdx_exp=dvdx.Exp;
    dvdy_exp=dvdy.Exp;
    /* Seperate mantissa*/
    w_mant=Wval.Mant;
    dudx_mant=dudx.Mant;
    dudy_mant=dudy.Mant;
    dvdx_mant=dvdx.Mant;
    dvdy_mant=dvdy.Mant;
    /* abs(larger)+abs(half the smaller) */
    if((dudx_exp>dvdx_exp)||((dudx_exp==dvdx_exp)
&&(dudx_mant>=dvdx_mant))){
        x_exp=dudx_exp;
        x_mant=dudx_mant+(dvdx_mant>>(x_exp-(dvdx_
            exp-1)));
    } else {
        x_exp=dvdx_exp;
        x_mant=dvdx_mant+(dudx_mant>>(x_exp-(dudx_
            exp-1)));
    }
    if(x_mant & 0x10000) { // Renormalize
        x_exp++;
        x_mant>>=0x1;
    }
    /* abs(larger)+abs(half the smaller) */
    if((dudy_exp>dvdy_exp)||((dudyexp==dvdy_exp)&&
        (dudy_mant>=dvdy_mant))){
        y_exp=dudy_exp;
        y_mant=dudy_mant+(dvdy_mant>>(y_exp-(dvdy_
            exp-1)));
    } else {
        y_exp=dvdy_exp;
        y_mant=dvdy_mant+(dudy_mant>>(y_exp-(dudy_
            exp-1)));
    }
    if(y_mant & 0x10000) {// Renormalize
        y_exp++;
        y_mant>>=0x1;
    }
    x_mant &=0xf800;
    y_mant &=0xf800;
    w_mant &=0xf800;
    /* Find the max of the two */
    if((x_exp>y_exp)||((x_exp==y_exp)&&(x_mant>=
y_mant))){
        result_exp=x_exp+w_exp;
        result_mant=x_mant+w_mant;
    } else{
        result_exp=y_exp +w_exp;
    }
    result_mant=y_13 mant+w_mant;
    if(result_mant & 0x10000) {//Renormalize
        result_mant>>=0x1;
        result exp++;
    }
    result_exp-=2;
    result_exp=(result_exp<<6) & 0xffffffc0;
    result_mant=(result_mant>>9) & 0x3f;
    result=(ulong)(result_exp|result_mant);
    return(result);
}
```

As can be seen, the equations for duldx, duldy, dv/dx, dv/dy are represented. The exponents and mantissas are separated (not necessary for the algorithm). The "abs(larger)+abs(half the smaller)" is used rather than the more complicated and computationally expensive "square root of the sum of the squares."

Certain functions used above may be unfamiliar, and are described below.

"log2_pitch" describes the width of a texture map as a power of two. For instance, a map with a width of $2^9$ or 512 texels would have a log2_pitch of 9.

"log2_height" describes the height of a texture map as a power of two. For instance, a map with a height of $2^{10}$ or 1024 texels would have a log2_height of 10.

FpMult performs Floating Point Multiplies, and can indicate when an overflow occurs.

```
FLT24 MeMag::FpMult(FLT24 float_a, FLT24 float_b,
ulong *overflow)
{
    ulong exp_carry;
    FLT24 result;
    result.Sign=float_a.Sign ^ float_b.Sign;
```

```
    /* mult mant_a & mant_b and or in implied 1 */
    result.Mant=(float_a.Mant * float_b.Mant);
    exp_carry=(result.Mant>>31) & 0x1;
    result.Mant=(result.Mant>>(15+exp_carry)) & 0xffff;
    result.Exp=float_a.Exp+float_b.Exp+exp_carry;
    if ((result.Exp>=0x7f)&&((result.Exp & 0x80000000)
!=0x80000000)){
      *overflow |=1;
      result.Exp=0x7f;/* clamp to invalid value */
    } else if (((result.Exp & 0x80) !=0x80)&&((resuft.Exp &
       0x80000000)==0x80000000)){
    // result.Exp=0xffffff80; // most neg exponent makes a
zero answer
    // result.Mant=0x8000;
    }
    return(result);
}
    FpAdd performs a Floating Point Addition, indicates
overflows, and has special accommodations knowing the
arguments are texture map coordinates.
    FLT24 MeMag::FpAdd(FLT24 a_val, FLT24 b_val,
ulong *overflow, ulong mapsize)
{
    ulong sign_a, mant_a, sign_b, mant_b;
    ulong exp_a, exp_b, Irg_exp, right_shft;
    ulong Irg_mant, small_mant;
    ulong pe_shft, mant_add, sign_mant_add;
    ulong tmp, exp_zero;
    ulong mant_msk, impld_one, mant2c_msk, mant2c_
msk1, shft_tst;
    ulong flt_tmp;
    FLT24 result;
    sign_a=a_val.Sign;
    sign_b=b_val.Sign;
    exp_a=a_val.Exp;
    exp_b=b_val.Exp;
    /*test to find when both exponents are 0x80 which is both
zero */
    exp_zero=0;
    /* find mask stuff for variable float size */
    mant_msk=1;
    flt_tmp=(NUM_MANT_BITS-1);
    mant_msk=0x7fff;
    impld_one=1<<NUM_MANT_BITS;
    mant2c_msk=impid_one | mant_msk;
    */ get the 2 NUM_MANT_BITS bit mantissa's in */
    mant_a=(a_val.Mant & mant_msk);
    mant_b=(b_val.Mant & mant_msk);
    */ get texture pipe mas spec to make good sense of this */
    if (((exp_b-exp_a)&0x80000000)==0x0){ /* swap true
if exp_b is less neg */
    Irg_mant=mant_b | impld_one; /* or in implied 1 */
    Irg_exp=exp_b;
    if(sign_b){
       Irg_mant=((Irg_mant^mant2c_msk)+1); /* 2 comp
          mant */
       Irg_mant |=((impld_one<<2)|(impld_one<<1));/*
          sign extend 2 bits */
       Irg_mant|=~mant2c_msk; /* sign extend to bit 18 bits
          */
    }
    right_shft=exp_b-exp_a;
    small_mant=mant_a | impld_one; /* or in implied 1 */
    small_mant>>=right_shft; /* right shift */
    if(sign_a){
       small_mant=((small_mant^mant2c_msk)+1); /* 2
          comp mant */
       small_mant |=((impld_one<<2)|(impld_one<<1));/*
          sign extend 2bits*/
       small_mant |=~mant2c_msk; /* sign extend to bit 18
          bits */
    }
    if (right_shft>NUM_MANT_BITS){ /* clamp small
       mant to zero if shift code */
       small_mant=0x0; /* exceeds size of shifter */
       sign_a=0;
    }
}else{
    Irg_mant=mant_a | impld_one; /* or in implied 1 */
    Irg_exp=exp_a;
    if(sign_a){
       Irg_mant=((Irg_mant^mant2c_msk)+1); /* 2 comp
          mant */
       Irg_mant |=((impld_one<<2)|(impid_one<<1)); /*
          sign extend to bit 18 bits */
       Irg_mant |=~mant2c_msk; /* sign extend to bit 18 bits */
    }
    right_shft=exp_a-exp_b;
    small_mant=mant_b | impld_one; /* or in implied 1 */
    small_mant>>=right_shft; /* right shift */
    if(sign_b){
       small_mant=((small_mant^mant2c_msk)+1); /* 2
          comp mant */
       small_mant |=((impld_one<<2)|(impld_one<<1)); /*
          sign extend to bit 18 bits */
       small_mant |=~mant2c_msk; /* sign extend to bit 18
          bits */
    }if (right_shft>NUM_MANT_BITS){(/* clamp small
       mant to zero if shift code */
       small_mant=0x0; /* exceeds size of shifter */
       sign_b=0;
    }
}
    mant2c_msk1=((mant2c_msk<<1)|1);
    mant_add=Irg_mant+small_mant;
    flt_tmp=(NUM_MANT_BITS+2);
    sign_mant_add=((mant_add>>flt_tmp) & 0x1);
    if (sign_mant_add){
    mant_add=(((mant_add & mant2c_msk1) ^ mant2c_
       msk1)+1);/* 2s'comp */
    /* if mant shifted MAX_SHIFT */
    tmp=(mant_add & mant2c_msk1);/* 17 magnitude bits
*/
    pe_shft=0; /* find shift code and shift mant_add */
    shft_tst=(impld_one<<1);
    while (((tmp & shft_tst)!=shft_tst)&&(pe_shft<=
MAX_SHIFT)){
       pe_shft++;
       tmp<<=1;
    }
    /* tmp has been left shifted by pe_sht, the msb is the
    * implied one and the next 15 of 16 are the 15 that we
       need
    */
    Irg_exp=((Irg_exp+1 -pe_shft)+(long)mapsize);
    mant_add=((tmp & mant2c_msk)>>1); /* take NUM_
MANT_BITS msbs of mant */
    /* overflow detect */
    if (((Irg_exp & 0x180)==0x080)||(Irg_exp==0x7f)){
```

```
*overflow=1;
Irg_exp=0x7f; /* Clamp to max value */
} else if (((Irg_exp & 0x180)==0x100)||(pe_shft>=
MAX_SHIFT)||
  (exp_zero)){ /*underflow detect */
  Irg_exp=0xffffff80; /* making the most negative number
    we can */
1. }
result.Sign=sign_mant_add;
result.Exp=Irg_exp;
result.Mant=mant_add | 0x8000;
return(result);
}
```

Texture Streamer Interface

The Mapping Engine will be responsible for issuing read request to the memory interface for the surface data that is not found in the on-chip cache. All requests will be made for double quad words except for the special compressed YUV0555 and YUV1544 modes that will only request single quad words. In this mode it will also be necessary to return quad word data one at a time.

Multiple Map Coordinate Sets

The Plane Converter may send one or two sets of planar coefficients to the Mapping Engine per primitive along with two sets of Texture State from the Command Stream Controller. To process a multiple textured primitive the application will start the process by setting the render state to enable a multiple texture mode. The application shall set the various state variables for the maps. The Command Stream Controller will be required to keep two sets of texture state data because in between triangles the application can change the state of either triangle. The CSC has single buffered state data for the bounding box, double buffered state data for the pipeline, and mip base address data for texture. The Command Stream Controller State runs in a special mode when it receives the multiple texture mode command such that it will not double buffer state data for texture and instead will manage the two buffers as two sets of state data. When in this mode, it could move the $1^{st}$ map state variable updates and any other non-texture state variable updates as soon as the CSI has access to the first set of state data registers. It then would have to wait for the plane converter to send the $2^{nd}$ stage texture state variables to the texture pipe at which time then it could write the second maps state data to the CSC texture map State registers.

The second context of texture data requires a separate mip_cnt state variable register to contain a separate pointer into the mip base memory. The mip_cnt register counts by two's when in the multiple maps per pixel mode with an increment of 1 output to provide the address for the second map's offset. This allows for an easy return to the normal mode of operation.

The Map Address Generator stalls in the multiple texture map mode until both sets of S and T planer coefficients are received. The state data transferred with the first set of coefficients is used to cause the stall if in the multiple textures mode or to gracefully step back into the double buffered mode when disabling multiple textures mode.

Motion Compensation Coordinate Computation

Figure 6:
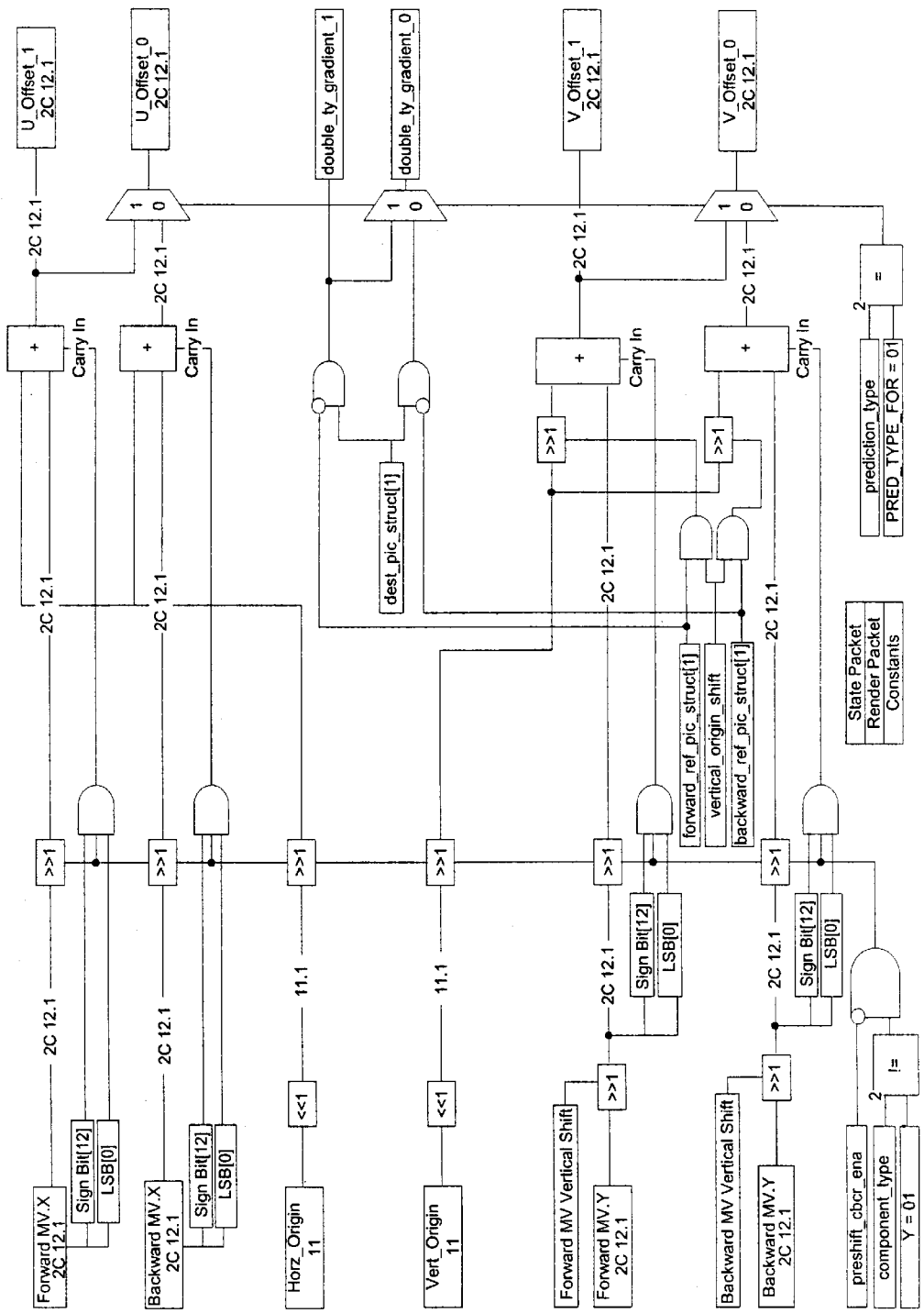
FIG. 6 is a schematic of the motion compensation coordinate computation.

The Map Address Generator computes the U and V coordinates for motion compensation primitives. The coordinates are received in the primitive packet, aligned to the expected format (Si 6.17) and also shifted appropriately based on the flags supplied in the packets. The coordinates are adjusted for the motion vectors, also sent with the command packet. The calculations are done as described in FIG. 6.

Reordering to Gain Memory Efficiency

The Map Address Generator processes a pixel mask from one span for each surface and then switches to the other surface and re-iterates through the pixel mask. This creates a grouping in the fetch stream per surface to decrease the occurrences of page misses at the memory pins.

LOD Dithering

The LOD value determined by the Map Address Generator may be dithered as a function of window relative screen space location.

Wrap, Wrap Shortest, Mirror, Clamp

The Mapping is capable of Wrap, Wrap Shortest, Mirror and Clamp modes in the address generation. The five modes of application of texture address to a polygon are wrap, mirror, clamp, wrap shortest. Each mode can be independently selected for the U and V directions.

In the wrap mode a modulo operation will be performed on all texel address to remove the integer portion of the address which will remove the contribution of the address outside the base map (addresses 0.0 to 1.0). This will leave an address between 0.0 and 1.0 with the effect of looking like the map is repeated over and over in the selected direction. A third mode is a clamp mode, which will repeat the bordering texel on all four sides for all texels outside the base map. The final mode is clamp shortest, and in the Mapping Engine it is the same as the wrap mode. This mode requires the geometry engine to assign only fractional values from 0.0 up to 0.999. There is no integer portion of texture coordinates when in the clamp shortest mode. In this mode the user is restricted to use polygons with no more than 0.5 of a map from polygon vertex to polygon vertex. The plane converter finds the largest of three vertices for U and subtracts the smaller two from it. If one of the two numbers is larger than 0.5, then add one to it or if both are set, then add 1 to both of them.

This allows maps to be repetitively map to a polygon strip or mesh and not have to worry about integer portions a map assignments to grow too big for the hardware precision range to handle.

Dependent Address Generation (DAG)

The Dependent Address Generator produces multiple addresses, which are derived from the single address computed by the Map Address Generator. These dependent addresses are required for filtering and planar surfaces.

Point Sampling

Point sampling of the map does not require any dependent address calculation and simply passes the original sample point through.

Bilinear Filtering

The Mapping Engine finds the perspective correct address in the map for a given set of screen coordinates and uses the LOD to determine the correct mip-map to fetch from. The addresses of the four nearest neighbors to the sample point are computed. This 2×2 filter serves as the bilinear operator. This fetched data then is blended and sent to the Color Calculator to be combined with the other attributes.

Tri-linear Address Generation

The coarser mip level address is created by the Dependent Address Generator and sent to the Cache Controller for comparison and the Fetch unit for fetching up to four double quad words with in the coarser mip. Right shifting the U and V addresses accomplishes this.

UV address creation for YUV4:2:0

When the source surface is a planar YUV4:2:0 and the output format is a packed RGB format the Texture Pipeline is required to fetch the YUV Data. The Cache is split in half and performs a data compare for the Y data in the first half and the UV data in the second half. This provides independent control over the UV data and the Y data where the UV data is one half the size of the Y data. The address generator operates in a different mode that shifts the Y address by one and cache control based of the UV address data in parallel with the Y data. The fetch unit is capable of fetching up to 4 DQW of Y data and 4 DQW of U and V data.

Non-power of two clamping

Additional clamping logic will be provided that will allow maps to be clamped to any given pixel instead of just power of two sizes.

Cache Controller

This function will manage the Texture Cache and determine when it is necessary to fetch a double quadword (128 bits) of texture data. It will generate the necessary interface signals to communicate with the FSI (Fetch Stream Interface) in order to request texture data. It controls several FIFOs to manage the delay of fetch streams and pipelined state variables.

Pixel FIFO

This FIFO stores texture cache addresses, texel location within a group, and a "etch required" bit for each texel required to process a pixel. The Texture Cache & Arbiter will use this data to determine which cache locations to store texture data in when it has been received from the FSI. the texel location within a group will be used when reading data from the texture cache.

Cache Scalability

The cache is structured as 4 banks split horizontally to minimize I/O and allow for the use of embedded ram cells to reduce gate counts. This memory structure architect can grow for future products, and allows accessibility to all data for designs with a wide range of performance and it is easily understood.

The cache design can scale possible performance and formats it supports by using additional read ports to provide data accessibility to a given filter design. This structure will be able to provide from ⅙ rate to full rate for all the different formats desired now and future by using between 1 and 4 read ports. The following chart illustrates the difference in performance capabilities between 1,2,3,4 read ports. The following abbreviations have been made: A-Alpha, R-Red, G-Green, B-Blue, L-Luminance, I-Indexed, Planar-Y,U,V components stored in separated surfaces, Bilnr-Bilinear filtering, Trlnr-Trilinear Filtering, HO-Higher Order Filter such as: (3×3 or 4×4, 4×2, 4×3. 4×4), R-Rate(Pipeline Rate).

For a Stretch Blifter to operate at rate on input data in the YUV (4:2:0) planar format and output the resulting data to a packed RGB format with bilinear filtering will require two read ports, and any higher order filters in the vertical direction will require three read ports. For the Stretch Bitter to stretch 1–720 pixels horizontal by 1–480 lines vertical to a maximum of 1280 horizontal×1024 vertical with the destination surface at 16 bits per pixel, the cache will need to output a pixel per clock minimum. For this reason the current Cobra design employs 2 read ports.

Cache Structure

The Texture Cache receives U, V, LOD, and texture state variable controls from the Texture Pipeline and texture state variable controls from the Command Stream Interface. It fetches texel data from either the FSI or from cache if it has recently been accessed. It outputs pixel texture data (RGBA) to the Color Calculator as often as one pixel per clock.

The Texture Cache works on several polygons at a time, and pipelines state variable controls associated with those polygons. It generates a "Busy" signal after it has received the next polygon after the current one it is working on, and releases this signal at the end of that polygon. It also generates a "Busy" if the read or fetch FIFOs fill up. It can be stopped by "Busy" signals that are sent to it from downstream at any time.

Texture address computations are performed to fetch double quad words worth of texels in all sizes and formats. The data that is fetched is organized as 2 lines by 2–32 bit texels, 4–16 bit texels, or 8—8 bit texels. If one considers that a pixel center can be projected to any point on a texture map, then a filter with any dimensions will require that intersected texel and its neighbor. The texels needed for a filter (point sampled, bilinear, 3×3, 4×3, and 4×4) may be contained in one to four double quad words. Access to data across fetch units has to be enabled. One method as described above is to build a cache with up to 16 banks that could organized so that up to any 4×4 group of texels could be accessed per clock, but as stated above these banks would be to small to be considered for use of embedded ram. But the following structure will allow access to any 2 by X group of texels with a single read port where X=2–32 bit texels, 4–16 bit texels, 8—8 bit texels as illustrated in the following diagrams.

The following figure illustrates a 4 banked cache, a 128 bit write port and 4 independent read ports.

The Cobra device will have two of the four read ports.

The double quad word(DQW) that will be selected and available at each read port will be a natural W, X, Y, or Z DQW from the map, or a row from two vertical DQW, or half of two horizontal DQW, or ¼ of 4 DQW's. The address generation can be conducted in a manner to guarantee that the selected DQW will contain the desired 1×1, 2×2, 3×2, 4×2 for point sampled, bilinear/trilinear, rectangular or top half of 3×3, rectangular or top half of 4×4 respectively. This relationship is easily seen with 32 bit texels and then easily extended to 16/8 bit texels. The diagrams below will illustrate this relationship by indicating the data that could be available at a single read port output. It can also be seen that two read ports could select any two DQW from the source map in a manner that all the necessary data could be available for higher order filters.

Pixel Selection

The arbiter maintains the job of selecting the appropriate data to send to the Color Out unit. Based on the bits per texel and the texel format the cache arbiter sends the upper left, upper right, lower left and lower right texels necessary to blend for the left and right pixels of both stream 0 and 1.

Color Keying

ColorKey is a term used to describe two methods of removing a specific color or range of colors from a texture map that is applied to a polygon.

When a color palette is used with indices to indicate a color in the palette, the indices can be compared against a state variable "ColorKey Index Value." If a match occurs and ColorKey is enabled, then action will be taken to remove the value's contribution to the resulting pixel color. Cobra will define index matching as ColorKey.

Palette

This look up table (LUT) is a special purpose memory that contains eight copies of 256 16-bit entries per stream. The palette data is loaded and must only be performed after a polygon flush to prevent polygons already in the pipeline from being processed with the new LUT contents. The CSI handles the synchronization of the palette loads between polygons.

The Palette is also used as a randomly accessed store for the scalar values that are delivered directly to the Command Stream Controller. Typically the Intra-coded data or the correction data associated with MPEG data streams would be stored in the Palette and delivered to the Color Calculator synchronous with the filtered pixel from the Data Cache.

Chroma Keying

ChromaKey are terms used to describe two methods of removing a specific color or range of colors from a texture map that is applied to a polygon.

The ChromaKey mode refers to testing the RGB or YUV components to see if they fall between a high (Chroma_High_Value) and low (Chroma_Low_Value) state variable values. If the color of a texel contribution is in this range and ChromaKey is enabled, then an action will be taken to remove this contribution to the resulting pixel color.

In both the ColorKey and ChromaKey modes, the values are compared prior to bilinear interpolation and the comparisons are made for four texels in parallel. The four comparisons for both modes are combined if enabled respectively. If texture is being applied in the nearest neighbor and the nearest neighbor value matched (either mode match bit is set), then the pixel write for that pixel being processed will be killed. This means that this pixel of the current polygon will be transparent. If the mode selected is bilinear interpolation, four values are tested for either ColorKey or ChromaKey and:

if none match, then
   the pixel is processed as normal,
else if only one of the four match (excluding nearest neighbor), then
   the matched color is replaced with the nearest neighbor color to produce a
   blend between the resulting three texels slightly weighted in favor of the
   nearest neighbor color,
else if two of the four match (excluding nearest neighbor), then
   a blend of the two remaining colors will be found
else if three colors match (excluding nearest neighbor), then
   the resulting color will be the nearest neighbor color.

This method of color removal will prevent any part of the undesired color from contributing to the resulting pixels, and will only kill the pixel write if the nearest neighbor is the match color and thus there will be no erosion of the map edges on the polygon of interest.

ColorKey matching can only be used if the bits per texel is not 16 (a color palette is used). The texture cache was designed to work even if in a non-compressed YUV mode, meaning the palette would be full of YUV components instead of RGB. This was not considered a desired mode since a palette would need to be determined and the values of the palette could be converted to RGB non-real time in order to be in an indexed RGB.

The ChromaKey algorithms for both nearest and linear texture filtering are shown below. The compares described in the algorithms are done in RGB after the YUV to RGB conversion.

NN texture nearest neighbor value
CHI=ChromaKey high value
CLO=ChromaKey low value
Nearest
if (CLO<=NN<=CHI) then delete the pixel from the primitive
end if
Linear
if (CLO<=NN<=CHI) then delete the pixel from the primitive
else if (CLO<=exactly 1 of the 3 remaining texels<=CHI) then replace that texel with the NN
else if (CLO<=exactly 2 of the 3 remaining texels<=CHI) then blend the remaining two texels
else if (CLO<=all 3 of the 3 remaining texels<=CHI) then use the NN
end if The color index key algorithms for both nearest and linear texture filtering follow:

NN=texture nearest neighbor value
CIV=color index value
Nearest
if (NN==CIV) then delete the pixel from the primitive
end if
Linear
if (NN==CIV) then delete the pixel from the primitive
else if (exactly 1 of the 3 remaining texels==CIV) then replace that texel with the NN
else if (exactly 2 of the 3 remaining texels==CIV) then blend the remaining two texels
else if (all 3 of the 3 remaining texels==CIV) then use the NN
end if

Color Space Conversion

Texture data output from bilinear interpolation may be either RGBA or YUVA. When it is in YUV (more accurately $YC_BC_R$), conversion to RGB will occur based on the following method. First the U and V values are converted to two's complement if they aren't already, by subtracting 128 from the incoming 8-bit values. Then the YUV values are converted to RGB with the following formulae:

Exact:

$$R = Y + 1.371V$$
$$G = Y - 0.336U - 0.698V$$
$$B = Y + 1.732U$$

Approximate:

$$R = Y + \frac{11}{8}V$$
$$G = Y - \frac{5}{16}U - \frac{11}{16}V$$
$$B = Y + \frac{7}{4}U$$

Where the approximate value given above will yield results accurate to 5 or 6 significant bits. Values will be clamped between 0.000000 and 0.111111 (binary).

Filtering

The shared filter contains both the texture/motion comp filter and the overlay interpolator filter. The filter can only service one module function at a time. Arbitration is required between the overlay engine and the texture cache with overlay assigned the highest priority. Register shadowing is required on all internal nodes for fast context switching between filter modes.

Overlay Interpolator

Data from the overlay engine to the filter consists of overlay A, overlay B, alpha, a request for filter use signal and a Y/color select signal. The function A+alpha(B-A) is calculated and the result is returned to the overlay module. Twelve such interpolators will be required consisting of a high and low precision types of which eight will be of the high precision variety and four will be of the low precision variety. High precision type interpolator will contain the following; the A and B signals will be eight bits unsigned for Y and −128 to 127 in two's complement for U and V. Precision for alpha will be six bits. Low precision type alpha blender will contain the following; the A and B signals will be five bits packed for Y, U and V. Precision for alpha will be six bits.

Texture/Motion Compensation Filter

Bilinear filtering is accomplished on texels using the equation:

$$C=C1(1-.u)(1-.v)+C2(.u(1-.v))+C3(.u^*.v)+C4(1-.u)^*.v$$

where C1, C2, C3 and C4 are the four texels making up the locations (U,V), (U+1,V), (U,V+1), and (U+1,V+1).

The values u and .v are the fractional locations within the C1, C2, C3, C4 texel box. Data formats supported for texels will be palletized, 1555 ARGB, 0565 ARGB, 4444 ARGB, 422 YUV, 0555 YUV and 1544 YUV. Perspective correct texel filtering for anisotropic filtering on texture maps is accomplished by first calculating the plane equations for u and v for a given x and y. Second, 1/w is calculated for the current x and y. The value D is then calculated by taking the largest of the dx and dy calculations (where dx=cx−u/wcx and dy=cy−u/wcy) and multiplying it by wxy. This value D is then used to determine the current LOD level of the point of interest. This LOD level will be determined for each of the four nearest neighbor pixels. These four pixels are then bilinear filtered in 2×2 increments to the proper sub-pixel location. This operation is preformed on four x-y pairs of interest and the final result is produced at ¼ the standard pixel rate. Motion compensation filtering is accomplished by summing previous picture (surface A, 8 bit precision for Y and excess 128 for U & V) and future picture (surface B, 8 bit precision for Y and excess 128 for U & V) together then divided by two and rounded up (+½). Surface A and B are filtered to 1/8 pixel boundary resolution. Finally, error terms are added to the averaged result (error terms are 9 bit total, 8 bit accuracy with sign bit) resulting in a range of −128 to 383, and the values are saturated to 8 bits (0 to 255).

Motion Compensation

MPEG2 Motion Compensation Overview

A brief overview of the MPEG2 Main Profile decoding process, as designated by the DVD specification, provides the necessary foundation understanding. The variable length codes in an input bit stream are decoded and converted into a two-dimensional array through the Variable Length Decoding (VLD) and Inverse Scan blocks, as shown in FIG. 1. The resulting array of coefficients is then inverse quantized (iQ) into a set of reconstructed Discrete Cosine Transform (DCT) coefficients. These coefficients are further inverse transformed (IDCT) to form a two-dimensional array of correction data values. This data, along with a set of motion vectors, are used by the motion compensation process to reconstruct a picture.

Figure 3:
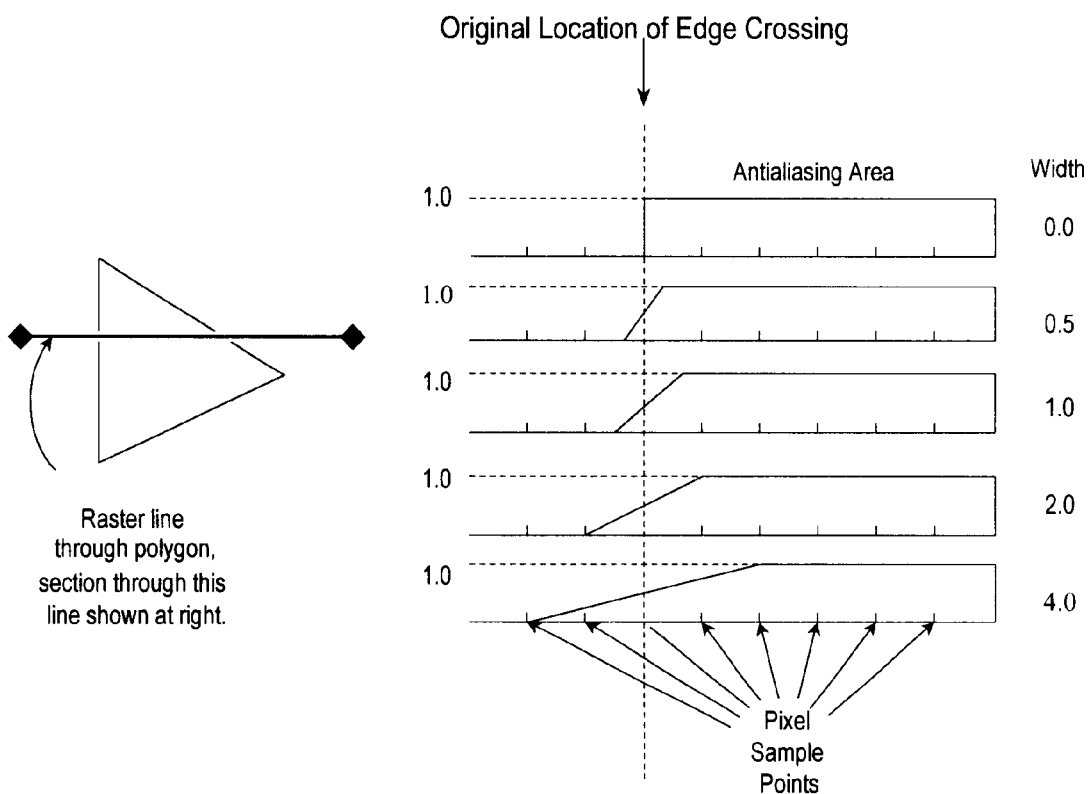
FIG. 3 illustrates the calculation of the antialiasing area.

Fundamentally, the Motion Compensation (MC) process consists of reconstructing a new picture by predicting (either forward, backward or bidirectionally) the resulting pixel colors from one or more reference pictures. Consider two reference pictures and a reconstructed picture. The center picture is predicted by dividing it into small areas of 16 by 16 pixels called "macroblocks". A macroblock is further divided into 8 by 8 blocks. In the 4:2:0 format, a macroblock consists of six blocks, as shown in FIG. 3, where the first four blocks describe a 16 by 16 area of luminance values and the remaining two blocks identify the chromanance values for the same area at ¼ the resolution. Two "motion vectors" are also on the reference pictures. These vectors originate at the upper left corner of the current macroblock and point to an offset location where the most closely matching reference pixels are located. Motion vectors may also be specified for smaller portions of a macroblock, such as the upper and lower halves. The pixels at these locations are used to predict the new picture. Each sample point from the reference pictures is bilinearly filtered. The filtered color from the two reference pictures is interpolated to form a new color and a correction term, the IDCT output, is added to further refine the prediction of the resulting pixels. The correction is stored in the Pallette RAM.

The following equation describes this process from a simplified global perspective. The (x', y') and (x", y") values are determined by adding their respective motion vectors to the current location (x, y).

$$Pel(x, y) = \frac{bilinear(Ref_{Forward}(x', y')) + bilinear(Ref_{Backward}(x'', y''))}{2} + Data_{Correction}(x, y)$$

This is similar to the trilinear blending equation and the trilinear blending hardware is used to perform the filtering for motion compensation. Reconstructed pictures are categorized as Intra-coded (I), Predictive-coded (P) and Bidirectionally predictive-coded (B). These pictures can be reconstructed with either a "Frame Picture Structure" or a "Field Picture Structure". A frame picture contains every scan-line of the image, while a field contains only alternate scan-lines. The "Top Field" contains the even numbered scan-lines and the "Bottom Field" contains the odd numbered scan-lines, as shown below.

The pictures within a video stream are decoded in a different order from their display order. This out-of-order sequence allows B-pictures to be bidirectionally predicted using the two most recently decoded reference pictures (either I-pictures or P-pictures) one of which may be a future picture. For a typical MPEG2 video stream, there are two adjacent B-pictures.

The DVD data stream also contains an audio channel, and a sub-picture channel for displaying bit-mapped images which are synchronized and blended with the video stream.

Hybrid DVD Decoder Data Flow

Figure 7:
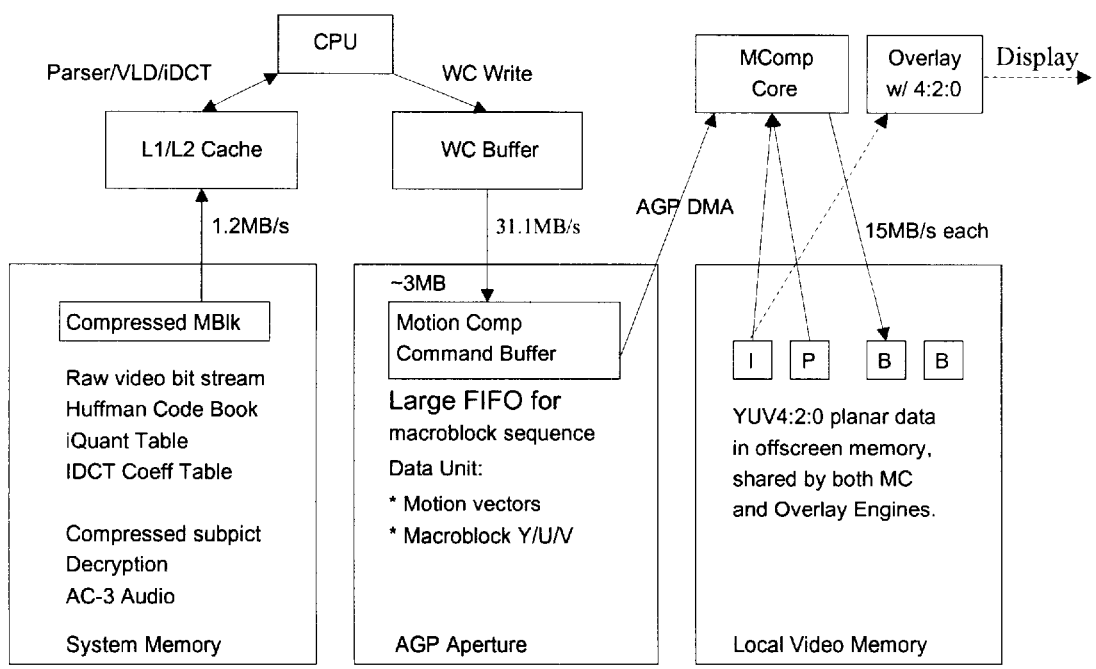
FIG. 7 is a block diagram showing the data flow and buffer allocation for an AGP graphic system with hardware motion compensation at the instant the motion compensation engine is rendering a B-picture and the overlay engine is displaying an I-picture.

The design is optimized for an AGP system. The key interface for DVD playback on a system with the hardware motion compensation engine in the graphics chip is the interface between the software decoder and the graphics hardware FIG. 7 shows the data flow in the AGP system. The navigation, audio/video stream separation, video package parsing are done by the CPU using cacheable system memory. For the video stream, variable-length decoding and inverse DCT are done by the decoder software using a small 'scratch buffer', which is big enough to hold one or more macroblocks but should also be kept small enough so that the most frequently used data stay in L1 cache for processing efficiency. The data include IDCT macroblock data, Huffman code book, inverse quantization table and IDCT coefficient table stay in L1 cache. The outputs of the decoder software are the motion vectors and the correction data. The graphics driver software copies these data, along with control information, into AGP memory. The decoder software then notifies the graphics software that a complete picture is ready for motion compensation. The graphics hardware will then fetch this information via AGP bus mastering, perform the motion compensation, and notify the decoder software when it is done. FIG. 7 shows the instant that both the two I and P reference pictures have been rendered. The motion compensation engine now is rendering the first bidirectional predictively-coded B-picture using I and P reference pictures in the graphics local memory. Motion vectors and correction data are fetched from the AGP command buffer. The dotted line indicates that the overay engine is fetching the I-picture for display. In this case, most of the motion compensation memory traffic stays within the graphics local memory, allowing the host to decode the next picture. Notice that the worst case data rate on the data paths are also shown in the figure.

Understanding the sequence of events required to decode the DVD stream provides the necessary foundation for establishing a more detailed specification of the individual units. The basic structure of the motion compensation hardware consists of four address generators which produced the quadword read/write requests and the sampling addresses for moving the individual pixel values in and out of the Cache. Two shallow FIFO's propagate the motion vectors between the address generators. Having multiple address generators and pipelining the data necessary to regenerate the addresses as needed requires less hardware than actually propagating the addresses themselves from a single generator.

The following steps provide some global context for a typical sequence of events which are followed when decoding a DVD stream.

Initialization

The application software allocates a DirectDraw surface consisting of four buffers in the off-screen local video memory. The buffers serve as the references and targets for motion compensation and also serves as the source for video overlay display.

The application software allocates AGP memory to be used as the command buffer for motion compensation. The physical memory is then locked. The command buffer pointer is then passed to the graphics driver.

I-Picture Reconstruction

A new picture is initialized by sending a command containing the pointer for the destination buffer to the Command Stream Interface (CSI).

The DVD bit stream is decoded and the iQ/IDCT is performed for an I-Picture.

The graphics driver software flushes the 3D pipeline by sending the appropriate command to the hardware and then enables the DVD motion compensation by setting a Boolean state variable on the chip to true. A command buffer DMA operation is then initiated for the P-picture to be reconstructed.

The decoded data are sent into a command stream low priority FIFO. This data consists of the macroblock control data and the IDCT values for the I-picture. The IDCT values are the final pixel values and there are no motion vectors for the I-picture. A sequence of macroblock commands are written into a AGP command buffer. Both the correction data and the motion vectors are passed through the command FIFO.

The CSI parses a macroblock command and delivers the motion vectors and other necessary control data to the Reference Address Generator and the IDCT values are written directly into a FIFO.

The sample location of each pixel (pel) in the macroblock is then computed by the Sample Address Generator.

A write address is produced by the Destination Address Generator for the sample points within a quadword and the IDCT values are written into memory.

I-Picture Reconstruction (Concealed Motion Vector)

Concealed motion vectors are defined by the MPEG2 specification for supporting image transmission media that may lose packets during transmission. They provide a mechanism for estimating one part of an I-Picture from earlier parts of the same I-Picture. While this feature of the MPEG2 specification is not required for DVD, the process is identical to the following P-Picture Reconstruction except for the first step.

The reference buffer pointer in the initialization command points to the destination buffer and is transferred to the hardware. The calling software (and the encoder software) are responsible for assuring that the all the reference addresses point to data that have already been generated by the current motion compensation process.

The remaining steps proceed as outline below for P-picture reconstruction.

P-Picture Reconstruction

A new picture is initialized by sending a command containing the reference and destination buffer pointers to the hardware.

The DVD bit stream is decoded into a command stream consisting of the motion vectors and the predictor error values for a P-picture. A sequence of macroblock commands is written into an AGP command buffer.

The graphics driver software flushes the 3D pipeline by sending the appropriate command to the hardware and then enables the DVD motion compensation by setting a Boolean state variable on the chip to true. A command buffer DMA operation is then initiated for the P-picture to be reconstructed.

The Command Stream Controller parses a macroblock command and delivers the motion vectors to the Reference Address Generator and the correction data values are written directly into a data FIFO.

The Reference Address Generator produces Quadword addresses for the reference pixels for the current macroblock to the Texture Stream Controller. When a motion vector contains fractional pixel location information, the Reference Address Generator produces quadword addresses for the four neighboring pixels used in the bilinear interpolation.

The Texture Cache serves as a direct access memory for the quadwords requested in the previous step. The ABCD pixel orientation is maintained in the four separate read banks of the cache, as used for the 3D pipeline. Producing these address is the task of the Sample Address Generator.

These four color values are bilinearly filtered using the existing data paths.

The bilinearly filtered values are added to the correction data by multiplexing the data into the color space conversion unit (in order to conserve gates).

A write addresses are generated by the Destination Address Generator for packed quadwords of sample values and are written into memory.

P-Picture Reconstruction (Dual Prime)

In a dual prime case, two motion vectors pointing to the two fields of the reference frame (or two sets of motion vectors for the frame picture, field motion type case) are specified for the forward predicted P-picture. The data from the two reference fields are averaged to form the prediction values for the P-picture. The operation of a dual prime P-picture is similar to a B-picture reconstruction and can be implemented using the following B-picture reconstruction commands.

The initialization command sets the backward-prediction reference buffer to the same location in memory as the forward-prediction reference buffer. Additionally, the backward-prediction buffer is defined as the bottom field of the frame.

The remaining steps proceed as outline below for B-picture reconstruction.

B-Picture Reconstruction

A new picture is initialized by sending a command containing the pointer for the destination buffer. The command also contains two buffer pointers pointing to the two most recently reconstructed reference buffers.

The DVD bit stream is decoded, as before, into a sequence of macroblock commands in the AGP command buffer for a B-picture.

The graphics driver software flushes the 3D pipeline by sending the appropriate command to the hardware and then enables DVD motion compensation. A command buffer DMA operation is then initiated for the B-picture.

The Command Stream Controller inserts the predictor error terms into the FIFO and passes 2 sets (4 sets in some cases) of motion vectors to the Reference Address Generator.

The Reference Address Generator produces Quadword addresses for the reference pixels for the current macroblock to the Texture Stream Controller. The address walking order proceeds block-by-block as before; however, with B-pictures the address stream switches between the reference pictures after each block. The Reference Address Generator produces quadword addresses for the four neighboring pixels for the sample points of both reference pictures.

The Texture Cache again serves as a direct access memory for the quadwords requested in the previous step. The Sample Address Generator maintains the ABCD pixel orientation for the four separate read banks of the cache, as used for the 3D pipeline. However, with B-pictures each of the four bank's dual read ports are utilized, thus allowing eight values to be read simultaneously.

These two sets of four color values are bilinearly filtered using the existing data paths.

The bilinearly filtered values are averaged and the correction values are added to the result by multiplexing the data into the color space conversion unit.

A destination address is generated for packed quadwords of sample values and are written into memory.

The typical data flow of a hybrid DVD decoder solution has been described. The following sections delve into the details of the memory organization, the address generators, bandwidth analysis and the software/hardware interface.

Address Generation (Picture Structure and Motion Type)

There are several distinct concepts that must be identified for the hardware for each basic unit of motion compensation:

1. Where in memory are the pictures containing the reference pixels?
2. How are reference pixels fetched?
3. How are the correction pixels ordered?
4. How are destination pixel values calculated?
5. How are the destination pixels stored?

In the rest of this section, each of these decisions is discussed, and correlated with the command packet structures described in the appendix under section entitled Hardware/Software Interface.

The following discussion focuses on the treatment of the Y pixels in a macroblock. The treatment of U and V pixels is similar. The major difference is that the motion vectors are divided by two (using fir rounding), prior to being used to fetch reference pixels. The resulting motion vectors are then used to access the sub-sampled UN data. These motion vectors are treated as offsets from the upper left corner of the UN pixel block. From a purist perspective this is wrong, since the origin of UN data is shifted by as much as a half a pixel (both left and down) from the origin of the Y data. However, this effect is small, and is compensated for in MPEG(1 and 2) by the fact that the encoder generates the correction data using the same "wrong" interpretation for the UN motion vector.

Where in Memory are the Pictures Containing the Reference Pixels?

There are three possible pictures in memory that could contain reference pixels for the current picture: past, present and future. How many and which of these possible pictures is actually used to generate a Destination picture depends in part on whether the Destination picture is I, B or P. It also depends in part on whether the Destination picture has a frame or field picture structure. Finally, the encoder decides for each macroblock how to use the reference pixels, and may decide to use less than the potentially available number of motion vectors.

The local memory addresses and strides for the reference pictures (and the Destination picture) are specified as part of the Motion Compensation Picture State Setting packet (MC00). In particular, this command packet provides separate address pointers for the Y, V and U components for each of three pictures, described as the "Destination", Forward Reference" and "Backward Reference". Separate surface pitch values are also specified. This allows different size images as an optimization for pan/scan. In that context some portions of the B-pictures are never displayed, and by definition are never used as reference pictures. So, it is possible to (a) never compute these pixels and (b) not allocate local memory space for them. The design allows these optimizations to be performed, under control of the MPEG decoder software. However, support for the second optimization will not allow the memory budget for a graphics board configuration to require less local memory.

Note, the naming convention. A forward reference picture is a past picture, that is nominally used for forward prediction. Similarly a backward reference picture is a future picture, which is available as a reference because of the out of order encoding used by MPEG.

There are several cases in the MPEG2 specification in which the reference data actually comes from the Destination picture. First, this happens when using concealment motion vectors for an I-picture. Second, the second field of a P-frame with field picture structure may be predicted in part from the first field of the same frame. However, in both of these cases, none of the macroblocks in the destination picture need the backwards reference picture. So, the software can program the backwards reference pointer to point to the same frame as the destination picture, and hence we do not need to address this case with dedicated hardware.

The selection of a specific reference picture (forward or backwards) must be specified on a per macroblock and per motion vector basis. Since there are up to four motion vectors with their associated field select flags specified per macroblock, this permits the software to select this option independently for each of the motion vectors.

How are Reference Pixels Fetched?

There are two distinct mechanisms for fetching reference pixels, called motion vector type in MPEG2 spec: Frame based and Field based.

Frame based reference pixel fetching is quite straight forward, since all reference pictures will be stored in field interleaved form. The motion vector specifies the offset within the interleaved picture to the reference pixel for the upper left corner (actually, the center of the upper left corner pixel) of the destination picture's macroblock. If a vertical half pixel value is specified, then pixel interpolation is done, using data from two consecutive lines in the interleaved picture. When it is necessary to get the next line of reference pixels, then they come from the next line of the interleaved picture. Horizontal halt pixel interpolation may also be specified.

Field-based reference pixel fetching, as indicated in the following figure, is analogous, where the primary difference is that the reference pixels all come from the same field. The major source Of complication is that the fields to be fetched from are stored interleaved, so the "next" line in a field is actually two lines lower in the memory representation of the picture. A second source of complication is that the motion vector is relative to the upper left corner of the field, which is not necessarily the same as the upper left corner of the interleaved picture.

How are the Correction Pixels Ordered?

Several cases will be discussed, which depend primarily on the picture structure and the motion type. For frame picture structure and frame motion type a single motion vector can be used to fetch 16 lines of reference pixel data. In this case, all 16 rows of the correction data would be fetched, and added to the 16 rows of reference pixel data. In most other cases only 8 rows are fetched for each motion vector.

The correction data, as produced by the decoder, an d contains data for two interleaved fields. The motion vector for the top field is only used to fetch 8 lines of V reference data, and these will be used with lines 0,2,4,6,8,10,12,14 of the correction data. The motion vector for the bottom field is used to fetch a different 8 lines of Y reference data, and these will be used with lines 1,3,5,7,9,11,13,15 of the correction data.

With field picture structure, all the correction data corresponds to only one field of the image. In these cases, a single motion vector can be used to fetch 16 lines of reference pixels. These 16 lines of reference pixels would be combined with the 16 lines of correction data to produce the result.

The major difference between these cases and the previous ones is the ability of the encoder to provide two distinct motion vectors, one to be used with the upper group of 16×8 pixels and the other to be used with the lower 16×8 pixels. Since each motion vector describes a smaller region of the image, it has the potential for providing a more accurate prediction.

How are Destination Pixel Values Calculated?

As indicated above, 8 or 16 lines of reference pixels and a corresponding number of correction pixels must be fetched. The reference pixels contain 8 significant bits (after carrying full precision during any half pixel interpolation and using "If" rounding), while the correction pixels contain up to 8 significant bits and a sign bit. These pixels are added to produce the Destination pixel values. The result of this signed addition could be between −128 and +383. The MPEG2 specification requires that the result be clipped to the range 0 to 255 before being stored in the destination picture.

Nominally the Destination UN pixels are signed values. However, the representation that is used is "excess 128" sometimes called "Offset Binary". Hence, when doing motion compensation the hardware can treat the UN pixels the same as Y pixels.

In several of the cases, two vectors are used to predict the same pixel. This occurs for bidirectional prediction and dual prime prediction . For these cases each of the two predictions are done as if they were the only prediction and the two results are averaged (using "//" rounding).

How are the Destination Pixels Stored?

In all cases destination pixels are stored as interleaved fields. The reference pixels and the correction data are already in interleaved format, so the results are stored in consecutive lines of the Destination picture. In all other cases, the result of motion compensation consists of lines for only one field at a time. Hence for these cases the Destination pixels are stored in alternate lines of the destination picture. The starting point for storing the destination pixels corresponds to the starting point for fetching correction pixels.

Arithmetic Stretch Blitter

The purpose of the Arithmetic Stretch Blitter is to up-scale or down-scale an image, performing the necessary filtering to provide a smoothly reconstructed image. The source image and the destination may be stored with different pixel formats and different color spaces. A common usage model for the Stretch Blitter is the scaling of images obtained in video conference sessions. This type of stretching or shrinking is considered render-time or front-end scaling and generally provides higher quality filtering than is available in the back-end overlay engine, where the bandwidth requirements are much more demanding.

The Arithmetic Stretch Blitter is implemented in the 3D pipeline using the texture mapping engine. The original image is considered a texture map and the scaled image is considered a rectangular primitive, which is rendered to the back buffer. This provides a significant gate savings at the cost of sharing resources within the device which require a context switch between commands.

Texture Compression Algorithm

The YUV formats described above have Y components for every pixel sample, and UN (they are more correctly named Cr and Cb) components for every fourth sample. Every UN sample coincides with four (2×2) Y samples. This is identical to the organization of texels in Real 3D patent 4,965,745 "YIQ-Based Color Cell Texturing", incorporated herein by reference. The improvement of this algorithm is that a single 32-bit word contains four packed Y values, one value each for U and V, and optionally four one-bit Alpha components:

YUV_0566: 5-bits each of four Y values, 6-bits each for U and V

YUV_1544: 5-bits each of four Y values, 4-bits each for U and V, four 1-bit Alphas These components are converted from 4-, 5-, or 6-bit values to 8-bit values by the concept of color promotion.

The reconstructed texels consist of Y components for every texel, and UN components repeated for every block of 2×2 texels.

The packing of the YUV or YUVA color components into 32-bit words is shown below:

```
{
    ulong Y0:5,
        Y1:5,
        Y2:5,
        Y3:5,
        U03:6,
        V03:6;
}Compress0566;
typedef struct
{
    ulong Y0:5,
        Y1:5,
        Y2:5,
        Y3:5,
        U03:4,
        V03:4,
        A0:1,
        A1:1,
        A2:1,
        A3:1;
}Compress1544;
```

The Y components (Y0, Y1, Y2, Y3) are stored as 5-bits (which is what the designations "Y0:5" mean). The U and V components are stored once for every four samples, and are designated U03 and V03, and are stored as either 6-bit or 4-bit components. The Alpha components (A0, A1, A2, A3) present in the "Compress1544" format, are stored as 1-bit components.

The following C++ source code performs the color promotion:

```
if(_SvCacheArb.texel_format[MapId]==SV_TEX_FMT_16BPT_YUV_0566){
    Compress0566 *UIptr, *Urptr, *LIptr, *Lrptr;
    UIptr=(Compress0566 *)&UITexel;
    Urptr=(Compress0566 *)&UrTexel;
    LIptr=(Compress0566 *)&LITexel;
    Lrptr=(Compress0566 *)&LrTexel;
    //Get Y component-- Expand 5 bits to 8 by msb->lsb replication
    if((ArbPix->VPos==0x0)&&((ArbPix->HPos & 0x1)==0x0)){
        Strm->UITexel=((((UIptr->Y0<<3) & 0xf8)|
            ((UIptr->Y0>>2) & 0x7))<<8);
        Strm->UrTexel=((((Urptr->Y1<<3) & 0xf8)|((Urptr->Y1>>2) & 0x7))<<8);
        Strm->LITexel=((((LIptr->Y2<<3) & 0xf8)|
            ((LIptr->Y2>>2) & 0x7))<<8);
        Strm->LrTexel=((((Lrptr->Y3<<3) & 0xf8)|
            ((Lrptr->Y3>>2) & 0x7))<<8);
    }else if ((ArbPix->VPos==0x0)&&((ArbPix->HPos & 0x1)==0x1)){
        Strm->UITexel=(((((UIptr->Y1<<3) & 0xf8)|
            ((UIptr->Y1>>2) & 0x7))<<8);
        Strm->UrTexel=(((((Urptr->Y0<<3) & 0xf8)|
            ((Urptr->Y1>>2) & 0x7))<<8);
        Strm->LITexel=(((((LIptr->Y3<<3) & 0xf8)|
            ((LIptr->Y3>>2) & 0x7))<<8);
        Strm->LrTexel=((((Lrptr->Y2<<3) & 0xf8)|
            ((Lrptr->Y2>>2) & 0x7))<<8);
    }else if ((ArbPix->VPos==0x1)&&((ArbPix->HPos & 0x1)==0x0)){
        Strm->UITexel=((((UIptr->Y2<<3) & 0xf8)|
            ((UIptr->Y2>>2) & 0x7))<<8);
        Strm->UrTexel=((((Urptr->Y3<<3) & 0xf8)|
            ((Urptr->Y3>>2) & 0x7))<<8);
        Strm->LITexel=((((LIptr->Y0<<3) & 0xf8)|
            ((LIptr->Y0>>2) & 0x7))<<8);
        Strm->LrTexel=((((Lrptr->Y1<<3) & 0xf8)|
            ((Lrptr->Y1>>2) & 0x7))<<8);
    }else if ((ArbPix->VPos==0x1)&&((ArbPix->HPos & 0x1)==0x1)){
        Strm->UITexel=(((((UIptr->Y3<<3) & 0xf8)|
            ((UIptr->Y3>>2) & 0x7))<<8);
        Strm->UrTexel=(((((Urptr->Y2<<3) & 0xf8)|
            ((Urptr->Y2>>2) & 0x7))<<8);
        Strm->LITexel=(((((LIptr->Y1<<3) & 0xf8)|
            ((Liptr->Y1>>2) & 0x7))<<8);
        Strm->LrTexel=(((((Lrptr->Y0<<3) & 0xf8)|
            ((Lrptr->Y0>>2) & 0x7))<<8);
    }
    //Get U component--Expand 6 bits to 8 by msb->lsb replication
    Strm->UITexel |=((((UIptr->U03<<2) & 0xfc)|
        ((UIptr->U03>>4) & 0x3))<<16);
    Strm->UrTexel |=((((Urptr->U03<<2) & 0xfc)|
        ((Urptr->U03>>4) & 0x3))<<16);
    Strm->LITexel |=((((LIptr->U03<<2) & 0xfc)|
        ((LIptr->U03>>4) & 0x3))<<16);
    Strm->LrTexel |=((((Lrptr->U03<<2) & 0xfc)|
        ((Lrptr->U03>>4) & 0x3))<<16);
    //Get v component--Expand 6 bits to 8 by msb->lsb replication
    Strm->UITexel |=(((UIptr->V03<<2) & 0xfc)|
        ((UIptr->V03>>4) & 0x3));
    Strm->UrTexel |=(((Urptr->V03<<2) & 0xfc)|
        ((Urptr->V03>>4) & 0x3));
    Strm->LITexel |=(((LIptr->V03<<2) & 0xfc)|((LIptr->V03>>4) & 0x3));
    Strm->LrTexel |=(((Lrptr->V03<<2) & 0xfc)|((Lrptr->V03>>4) & 0x3));
```

```
}else if (_SvCacheArb.texel_format[MapId]==SV_
  TEX_FMT_16BPT_YUV_1544){
Compress1544*UIptr, *Urptr, *LIptr, *Lrptr;
UIptr (Compress1544*)&UITexel;
Urptr=(Compress1544*)&UrTexel;
LIptr=(Compress1544*)&LITexel;
Lrptr=(Compress1544*)&LrTexel;
//Get Y component--Expand 5 bits to 8 by msb->lsb
  replication
if((ArbPix->VPos==0x0)&&((ArbPix->HPos &
  0x1)==0x0)){
  Strm->UITexel=((((UIptr->Y0<<3) & 0xf8)|
    ((UIptr->Y0>>2) & 0x7))<<8);
  Stmm->UrTexel=((((Urptr->Y1<<3) & 0xf8)|
    ((Urptr->Y1>>2) & 0x7))<<8);
  Strm->LITexel=((((LIptr->Y2<<3) & 0xf8)|
    ((LIptr->Y2>>2) & 0x7))<<8);
  Strm->LrTexel=((((Lrptr->Y3<<3) & 0xf8)|
    ((Lrptr->Y3>>2) & 0x7))<<8);
  Strm->UITexel |=UIptr->A0 ? 0xff000000:0x0;
  Strm->UrTexel |=Urptr->A1 ? 0xff000000:0x0;
  Strm->LITexel |=LIptr->A2 ? 0xff000000:0x0;
  Strm->LrTexel |=Lrptr->A3 ? 0xff000000:0x0;
}else if ((ArbPix->VPos==0x0)&&((ArbPix->HPos
  & 0x1)=0x1)){
  Strm->UITexel=((((UIptr->Y1<<3) & 0xf8)|
    ((UIptr->Y1>>2) & 0x7))<<8);
  Strm->UrTexel=((((Urptr->Y0<<3) & 0xf8)|
    ((Urptr->Y0>>2) & 0x7))<<8);
  Strm->LITexel=((((LIptr->Y3<<3) & 0xf8)|
    ((LIptr->Y3>>2) & 0x7))<<8);
  Strm->LrTexel=((((Lrptr->Y2<<3) & 0xf8)|
    ((Lrptr->Y2>>2) & 0x7))<<8);
  Strm->UITexel |=UIptr->A1 ? 0xff000000:0x0;
  Strm->UrTexel |=Urptr->AO ? 0xff000000:0x0;
  Strm->LITexei |=LIptr->A3 ? 0xff000000:0x0;
  Strm->LrTexel |=Lrptr->A2 ? 0xff000000:0x0;
}else if ((ArbPix->VPos==0x1)&&((ArbPix->HPos
  & 0x1)==0x0)){
  Strm->UITexel=((((UIptr->Y2<<3) & 0xf8)|
    ((UIptr->Y2>>2) & 0x7))<<8);
  Strm->UrTexel=((((Urptr->Y3<<3) & 0xf8)|
    ((Urptr->Y3>>2) & 0x7))<<8);
  Strm->LlTexel=((((LIptr->Y0<<3) & 0xf8)|
    ((LIptr->Y0>>2) & 0x7))<<8);
  Strm->LrTexel=((((LIptr->Y0<<3) & 0xf8)|
    ((Lrptr->Y0>>2) & 0x7))<<8);
  Strm->UITexel |=UIptr->A2 ? 0xff000000:0x0;
  Strm->UrTexel |=Urptr->A3 ? 0xff000000:0x0;
  Strm->LITexel |=LIptr->A0 ? 0xff000000:0x0;
  Strm->LrTexel |=Lrptr->A2 ? 0xff000000:0x0;
}else if ((ArbPix->VPos==0x1)&&((ArbPix->HPos
  & 0x1)==0x1)){
  Strm->UITexel=((((UIptr->Y3<<3) & 0xf8)|
    ((UIptr->Y3>>2) & 0x7))<<8);
  Strm->UrTexel=((((Urptr->Y2<<3) & 0xf8)|
    ((Urptr->Y2>>2) & 0x7))<<8);
  Strm->LITexel=((((LIptr->Y1<<3) & 0xf8)|
    ((LIptr->Y1>>2) & 0x7))<<8);
  Strm->LrTexel=((((Lrptr->Y0<<3) & 0xf8)|
    ((Lrptr->Y0>>2) & 0x7))<<8);
  Strm->UrTexel |=UIptr->A3 ? 0xff000000:0x0;
  Strm->UrTexel |=Urptr->A2 ? 0xff000000:0x0;
  Strm->LITexel |=LIptr->A1 ? 0xff000000:0x0;
  Strm->LrTexel |=Lrptr->A0 ? 0xff000000:0x0;
}
  //Get U component--Expand 4 bits to 8 by msb-
  >lsb replication
  Strm->UITexel |=((((UIptr->U03<<4) & 0xf0)|
    (UIptr->U03 & 0xf)<<16);
  Strm->UrTexel |=((((Urptr->U03<<4) & 0xf0)|
    (Urptr->U03 & 0xf))<<16);
  Strm->LITexel |=((((LIptr->U03<<4) & 0xf0)|
    (LIptr->U03 & 0xf))<<16);
  Strm->LrTexel |=((((Lrptr->U03<<4) & 0xf0)|
    (Lrptr->U03 & 0xf))<<16);
  //Get v component--Expand 4 bits to 8 by msb->lsb
    replication
  Strm->UITexel |=(((UIptr->V03<<4) & 0xf0)|
    (UIptr->V03 & 0xf0);
  Strm->UrTexel |=(((Urptr->V03<<4) & 0xf0)|
    (Urptr->V03 & 0xf));
  Strm->LITexel |=(((LIptr->V03<<4) & 0xf0)|
    (LIptr->V03 & 0xf));
  Strm->LrTexel |=(((Lrptr->V03<<4) & 0xf0)|
    (Lrptr->V03 & 0xf));
}
```

The "VPos" and "HPos" tests performed for the Y component are to separate out different cases where the four values arranged in a 2×2 block (named UI, Ur, LI, Lr for upper left, upper right, lower left, and lower right) are handled separately. Note that this code describes the color promotion, which is part of the decompression (restoring close to full-fidelity colors from the compressed format.

Full 8-bit values for all color components are present in the source data for all formats except RGB16 and RGB15. The five and six-bit components of these formats are converted to 8-bit values either by shifting five-bit components up by three bits (multiplying by eight) and six-bit components by two bits (multiplying by four), or by replication. Five-bit values are converted to 8-bit values by replication by shifting the 5 bits up by three positions, and repeating the most significant three bits of the 5-bit value as the lower three bits of the final 8-bit value. Similarly, six-bit values are converted by shifting the 6 bits up by two positions, and repeating the most significant two bits of the 6-bit value as the lower two bits of the final 8-bit value.

The conversion of five and six bit components to 8-bit values by replication can be expressed as:

$$C_8=(C_5<<3)|(C_5>>2) \text{ for five-bit components}$$

$$C_8=(C_6<<2)|(C_6>>4) \text{ for six-bit components}$$

Although this logic is implemented simply as wiring connections, it obscures the arithmetic intent of the conversions. It can be shown that these conversion implement the following computations to 8-bit accuracy:

$$C_8 = \frac{255}{31}C_5 \text{ for five-bit components}$$

$$C_8 = \frac{255}{63}C_6 \text{ for six-bit components}$$

Thus replication expands the full-scale range from the to 31 range of five bits or the 0 to 63 range of six bits to the 0 to 255 range of eight bits. However, for the greatest computational accuracy, the conversion should be performed by shifting rather than by replication. This is because the pipeline's color adjustment/conversion matrix can carry out the expansion to full range values with greater precision than the replication operation. When the conversion from 5 or 6 bits to 8 is done by shifting, the color conversion matrix coefficients must be adjusted to reflect that the range of promoted 6-bit components is 0 to 252 and the range of promoted 5-bit components is 0 to 248, rather than the normal range of 0 to 255.

The combination of the YIQ-Based Color Cell Texturing concept, the packing of components into convenient 32-bit words, and color promoting the components to 8-bit values yields a compression from 96 bits down to 32 bits, or 3:1.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for determining the rate of change of texture address variables U and V as a function of address variables x and y of a pixel, wherein, U is the texture coordinate of the pixel in the S direction V is the texture coordinate of the pixel in the T direction W is the homogenous w value of the pixel (typically the depth value)

Inv_W is the inverse of W

C0n is the value of attribute n at some reference point. (x'=0, y'=0)

CXn is the change of attribute n for one pixel in the raster x direction

CYn is the change of attribute n for one pixel in the raster y direction n includes S=U/W and T=V/W x is the screen coordinate of the pixel in the x raster direction y is the screen coordinate of the pixel in the y raster direction the method comprising the steps of:

calculate the start value and rate of change in raster x,y direction for the attribute T resulting in C0s, CXs, Cys;

calculate the start value and rate of change in the raster x,y direction for the attribute T, resulting in C0t, CXt, Cyt;

calculate the start value and rate of change in the raster x,y direction for the attribute 1/W, resulting in C0inv_W, CXinv_W, CYinv_W;

calculate the perspective correct values of U and V resulting in $$U = \frac{C0s + CXs*X + CYs*Y}{C0inv\_w + CXinv\_w*X + CYinv\_w*Y}$$

$$V = \frac{C0t + CXt*X + CYt*Y}{C0inv\_w + CXinv\_w*X + CYinv\_w*Y}$$

Calculate the rate of change of texture address variables U and V as a function of address variables x and y, resulting in $$\frac{du}{dx} = W*[CXs - U*\text{CXinv\_w}]$$

$$\frac{du}{dy} = W*[CYs - U*\text{CYinv\_w}]$$

$$\frac{dv}{dy} = W*[CYt - V*\text{CYinv\_w}].$$

2. The method of claim 1 further including the step of determining a mip-map selection and a weighting factor for trilinear blending in a texture mapping process comprising calculating:

$$LOD = \text{Log2}\left[W*\text{MAX}\left[\begin{array}{l}\sqrt{(CXs - U*\text{CXinv\_w})^2 + (CXt - V*\text{CXinv\_w})^2}, \\ \sqrt{(CYs - U*\text{CYinv\_w})^2 + (CYt - V*\text{CYinv\_w})^2}\end{array}\right]\right].$$

3. The method of claim 1 further including the step of determining a mip-map selection and a weighting factor for trilinear blending in a texture mapping process comprising calculating:

$$LOD = \text{Log2}(W) + \text{Log2}\left[\text{MAX}\left[\begin{array}{l}\sqrt{(CXs - U*\text{CXinv\_w})^2 + (CXt - V*\text{CXinv\_w})^2}, \\ \sqrt{(CYs - U*\text{CYinv\_w})^2 + (CYt - V*\text{CYinv\_w})^2}\end{array}\right]\right].$$

* * * * *